United States Patent [19]

Sturtz, Jr. et al.

[11] 4,226,270
[45] Oct. 7, 1980

[54] TREE HARVESTER

[75] Inventors: Charles R. Sturtz, Jr., St. Joseph, Mich.; Robert W. Joworski, London, Canada

[73] Assignee: Clark Equipment Company, Buchanan, Mich.

[21] Appl. No.: 860,359

[22] Filed: Dec. 14, 1977

[51] Int. Cl.³ .................. A01G 23/08; B27L 1/00
[52] U.S. Cl. .................. 144/2 Z; 144/3 D
[58] Field of Search .................. 144/2 Z, 3 D, 34 R, 144/34 E, 309 AC; 91/512, 530; 74/522 S; 254/166, 175.3, 189

[56] References Cited

U.S. PATENT DOCUMENTS

| | | | |
|---|---|---|---|
| 3,721,280 | 3/1973 | French et al. | 144/2 Z |
| 3,894,568 | 7/1975 | Windsor | 144/2 Z |
| 3,896,862 | 7/1975 | Windsor | 144/2 Z |

Primary Examiner—W. Donald Bray
Attorney, Agent, or Firm—Harry G. Thibault

[57] ABSTRACT

A tree harvester includes a wheeled and articulated frame, a horizontally disposed first elongated beam member, an extendable beam member that is longitudinally extendable from the first beam member, a carriage that is longitudinally movable on the extendable beam member, delimber knives that are mounted on the carriage, and topping knives that are mounted on the carriage.

The carriage is longitudinally reciprocated by first and second flexible tension mechanisms. One of the flexible tension mechanisms actuates the carriage in one longitudinal direction and also actuates the delimber knives. The other flexible tension mechanism actuates the carriage in the other direction and also actuates topping knives.

The tree harvester is powered by a hydraulic system; and a hydraulic pilot system cooperates with a snowflake cam mechanism to provide automatic control of the delimbing operations.

59 Claims, 18 Drawing Figures

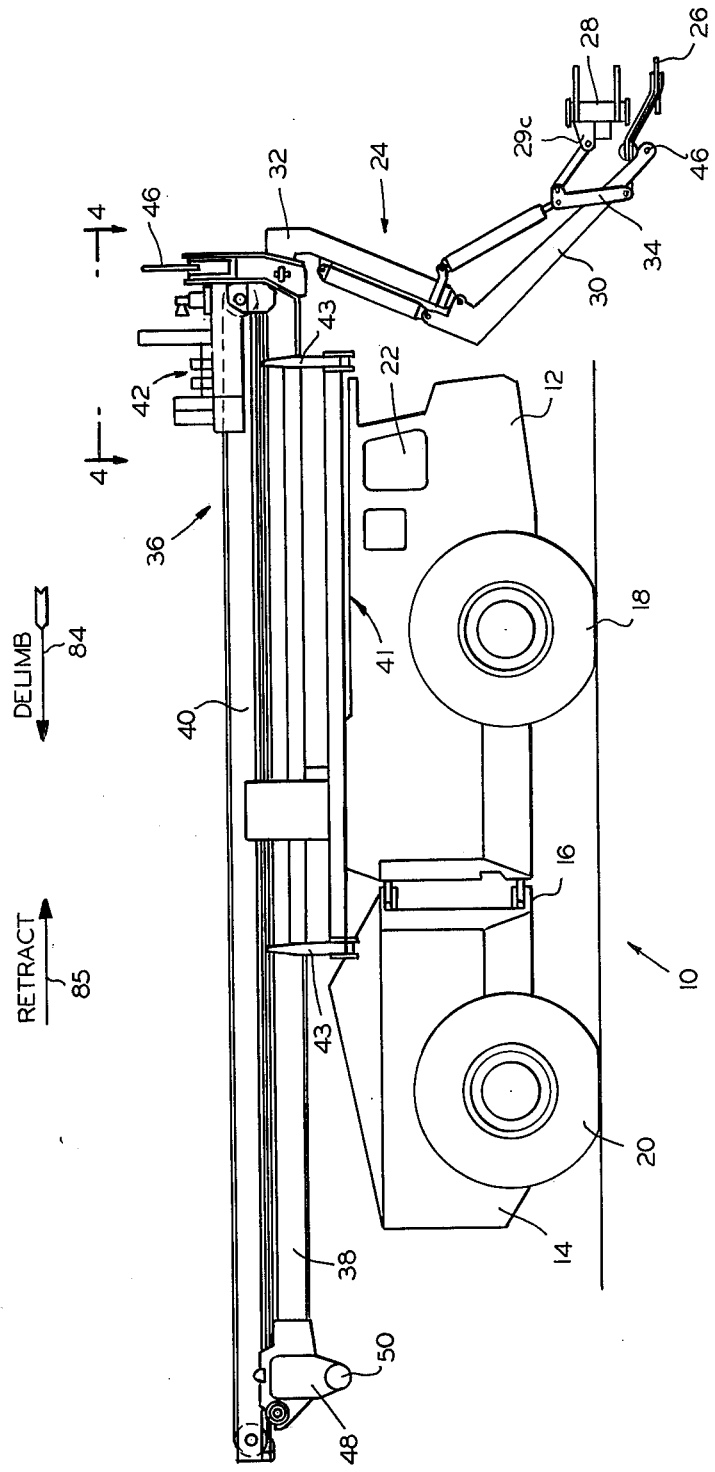

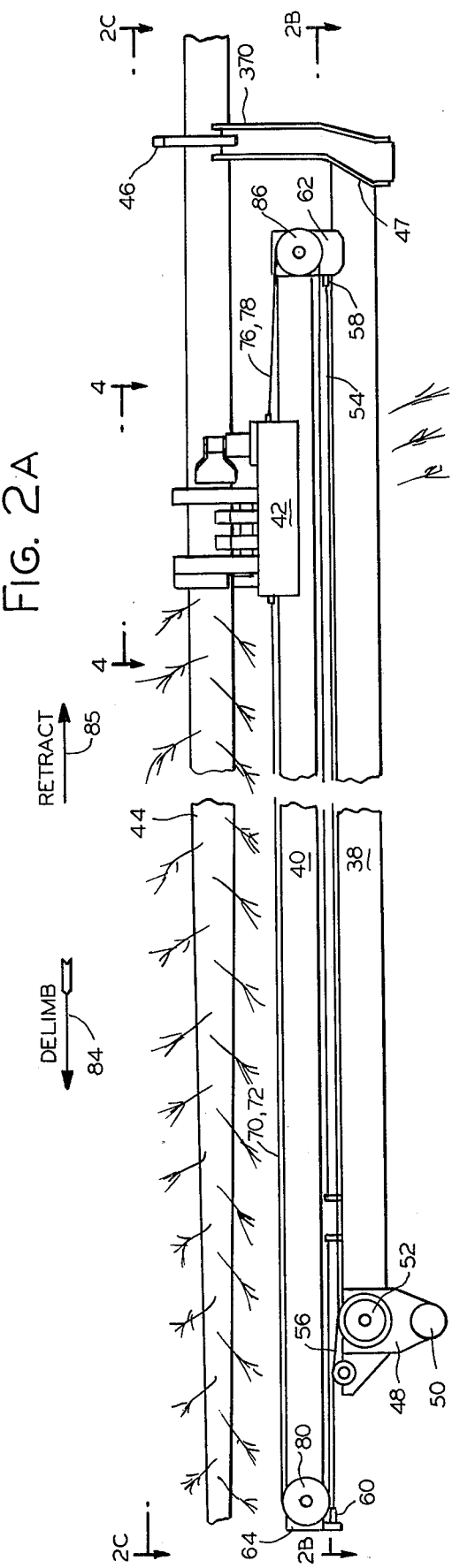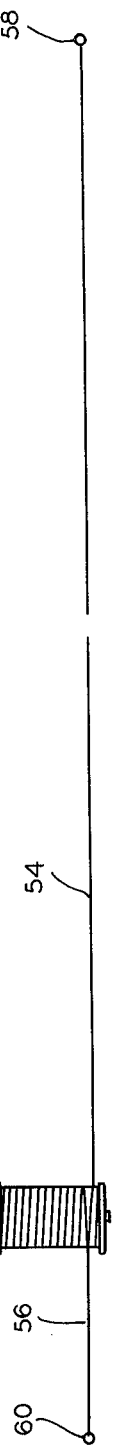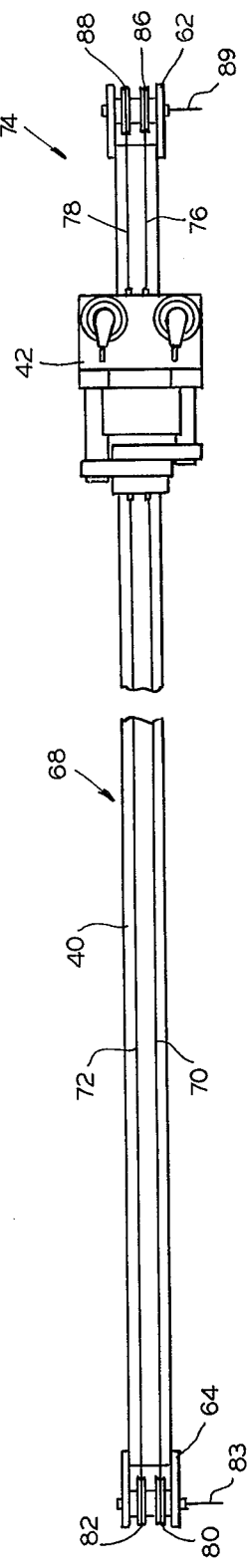
Fig. 2A
Fig. 2B
Fig. 2C

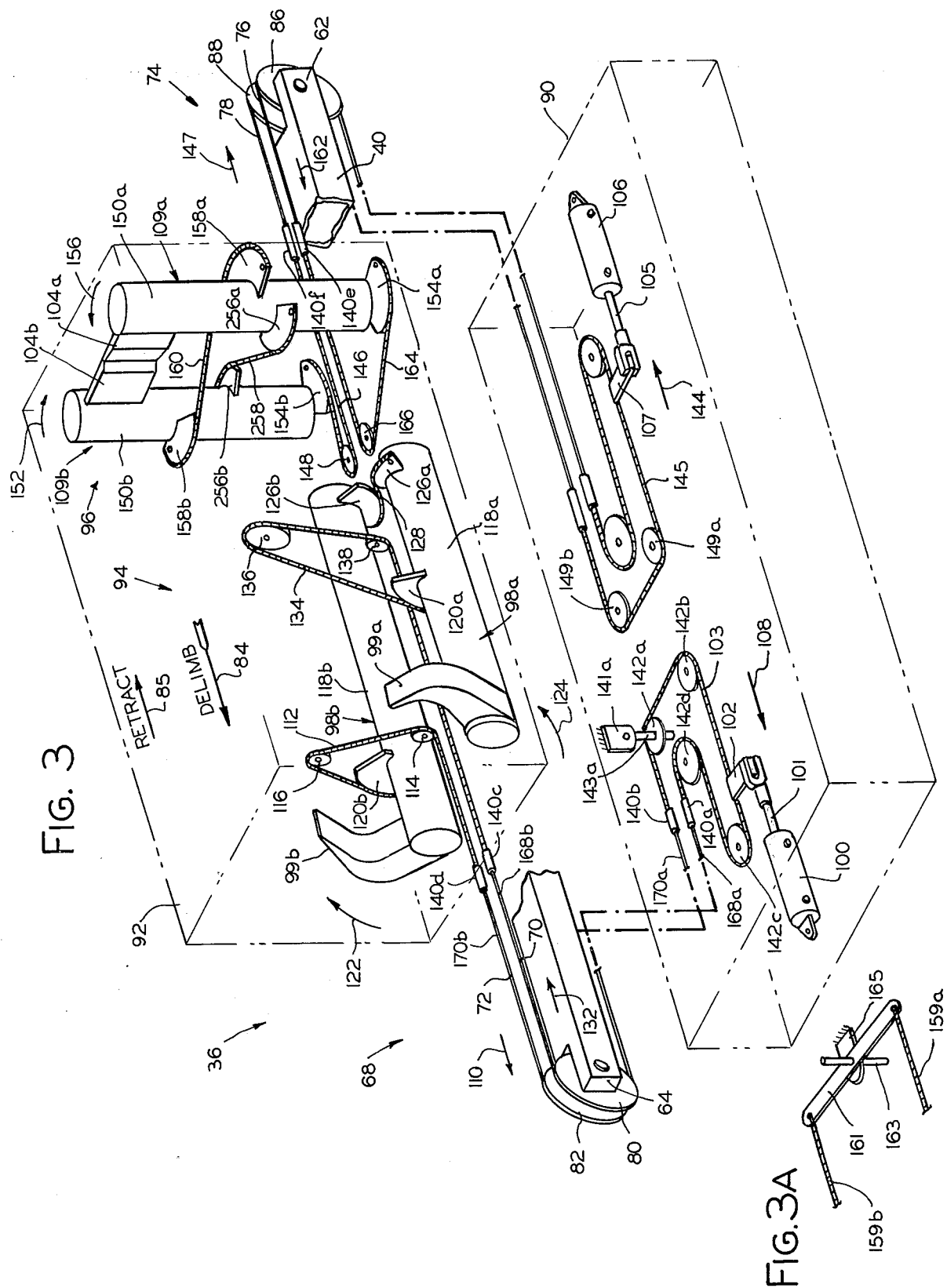

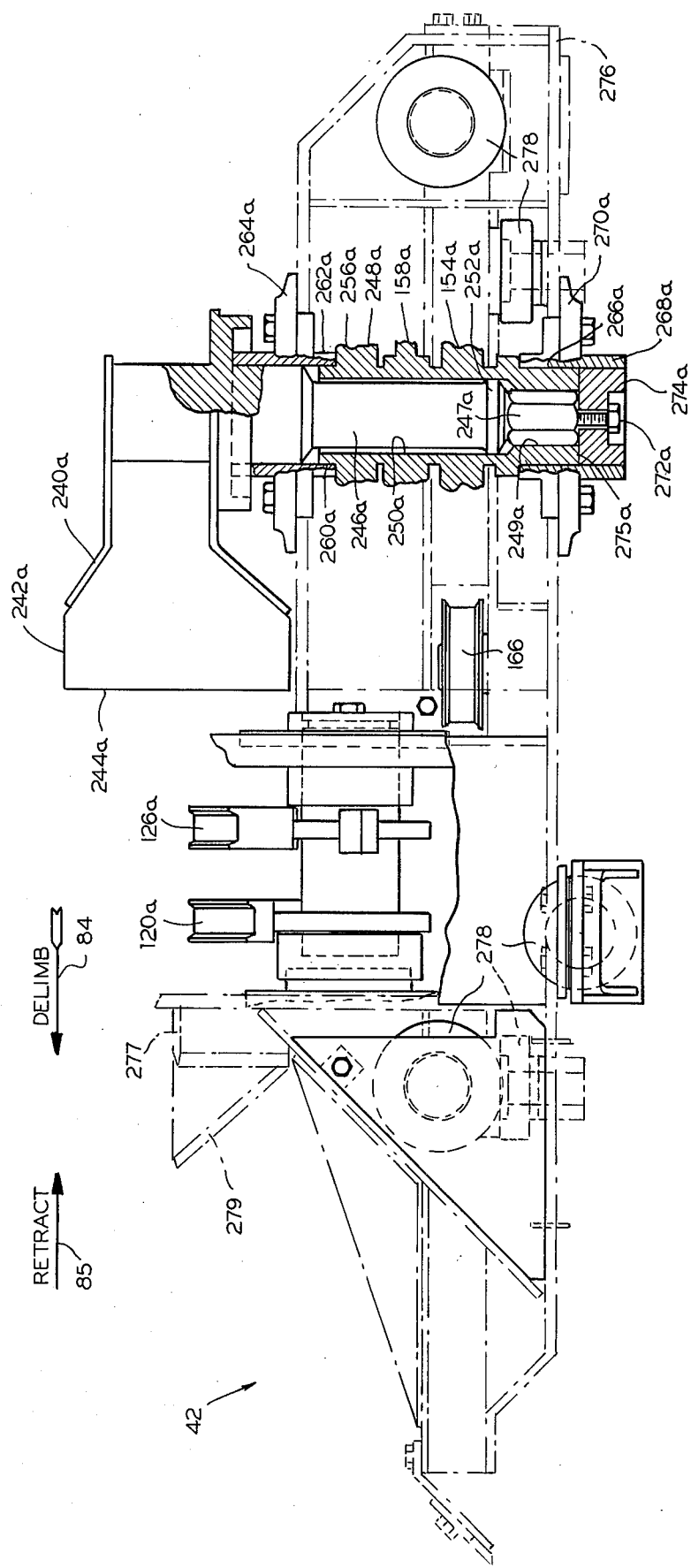

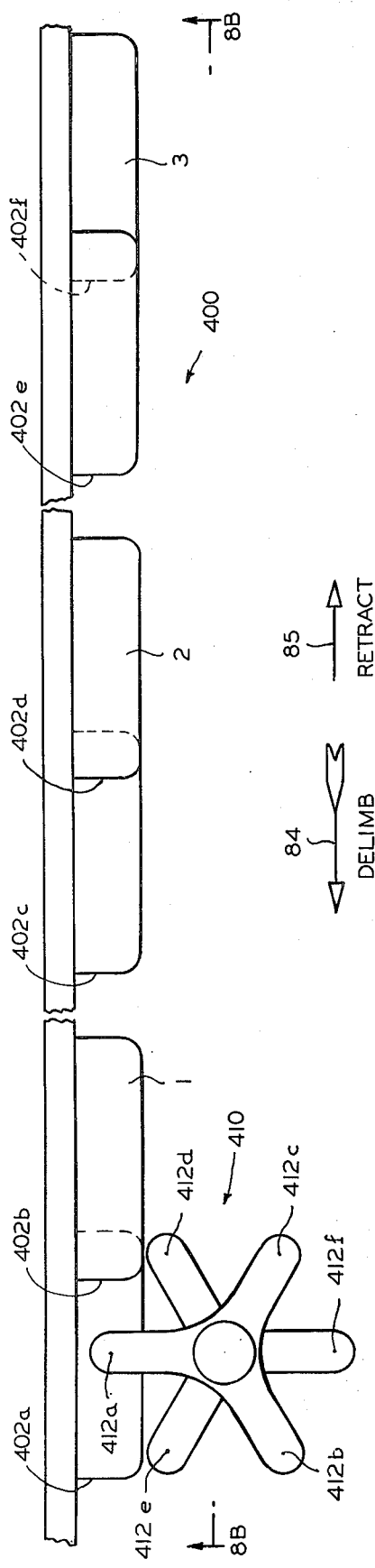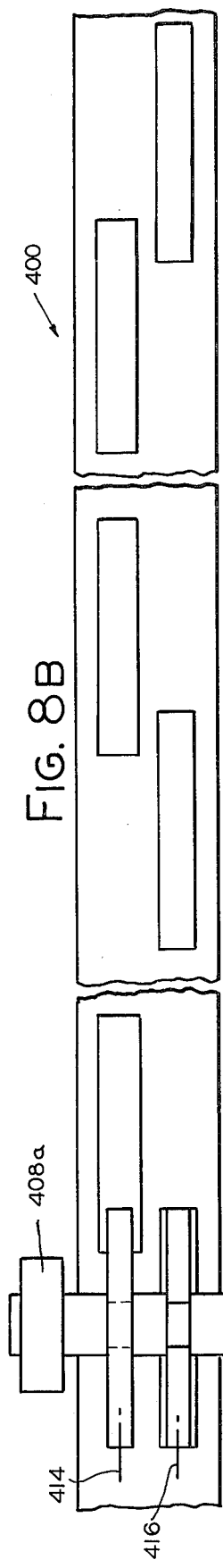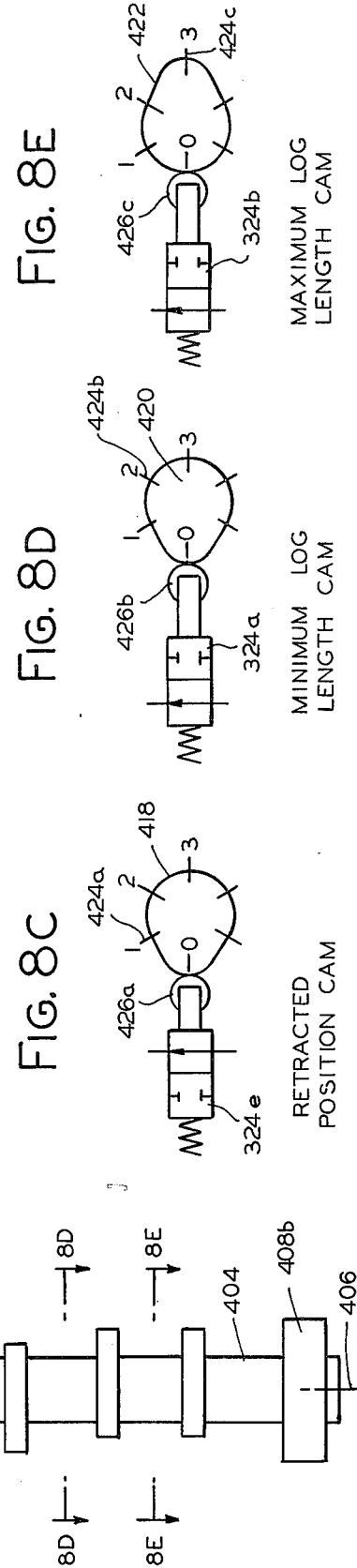

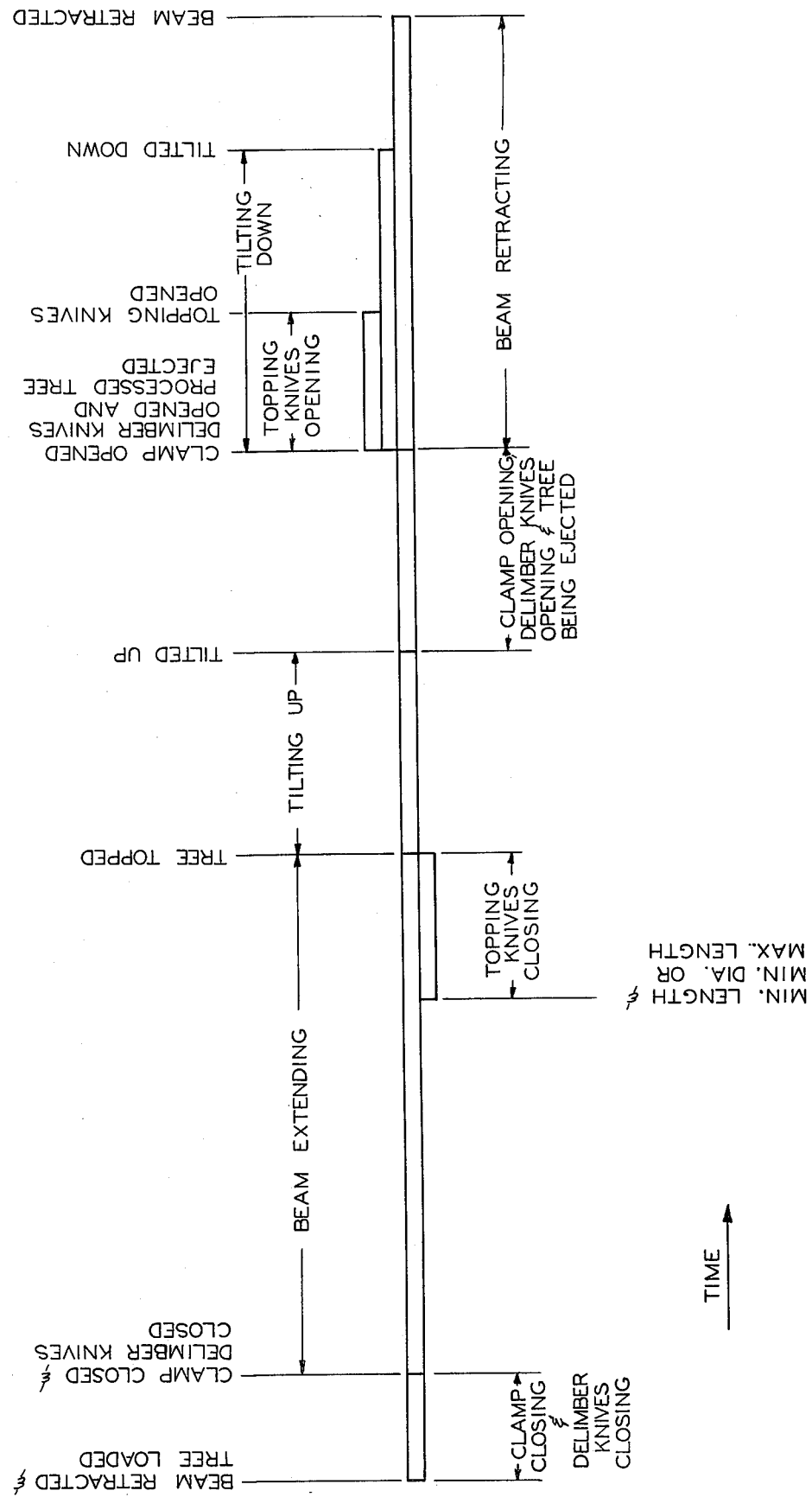

TREE HARVESTER

BACKGROUND OF THE INVENTION

1. Field of the Invention

The present invention relates generally to tree harvesters, and more particularly to tree harvesters of the type which combine the operations of shearing, delimbing, topping, and bunking of processed trees.

2. Description of the Prior Art

The prior art in tree harvesters includes U.S. Pat. No. 3,905,407 in which a horizontally disposed tree processing mechanism is mounted onto a wheeled and articulated frame and a tree transfer mechanism that includes a grapple and shear is mounted to one end of the tree processing mechanism. In operation, the grapple is secured to the tree near the ground, the shear severs the tree from its roots intermediate of the grapple and the ground, and the tree transfer mechanism horizontally positions the tree onto the tree processing mechanism.

In sequence, a processing clamp closes around the butt end of the felled and horizontally positioned tree, delimber knives close around the tree, the delimber knives move longitudinally toward the top of the tree stripping limbs therefrom as they move, topping knives remove the top of the tree, the processing clamp is opened, and the processed tree is dropped into a bunk on the side of the tree harvester.

A first flexible cable mechanism is used to reciprocably actuate an extendable beam member that is guidingly mounted on a first elongated beam member, and a second flexible tension mechanism is used to reciprocate the carriage on the extendable beam member, the delimber knives and the topping knives being carried by the carriage.

The delimber and topping knives are mechanically closed by springs and are mechanically opened by carriage movement. This mechanical actuation of the delimber and topping knives has the limitations of limiting the delimber and topping knife closing forces, precluding the maintaining of constant delimber knife closing forces versus changes in tree diameter, precluding easy adjustment of delimber knife closing forces that are required for different seasons, limiting the flexibility of automatic sequencing cycles, and requiring that the topping knives precede the delimbing knives.

In particular, it is desirable to return the carriage to the retracted position after topping a small tree without the carriage proceeding to the maximum log length, so as to reduce the cycle time of the machine.

Also, it is desirable for the topping knives to follow the delimbing knives because the topping knives are subject to jamming by limbs that are accumulated in front of the delimber knives if the topping knives precede the delimber knives.

The prior art also includes U.S. Pat. No. 3,924,667, of common ownership entity with that of the aforementioned patent and with the present invention, in which the processing clamp tilts upwardly before opening, facilitating the dropping of a processed tree into the bunk.

The complete specifications of both U.S. Pat. No. 3,905,407 and U.S. Pat. No. 3,924,667 are included in the specification of the present invention by reference herein thereto.

SUMMARY OF THE INVENTION

In accordance with the broader aspects of this invention, there is provided a tree harvester which includes a horizontally disposed first elongated beam member that is mounted to a wheeled and articulated frame, a second elongated beam member that is longitudinally extendable from the first elongated beam member, a carriage that is guidingly mounted to the second elongated beam member, a pair of delimber knives that are mounted to the carriage and that are movable for opening and for closing around a tree that is disposed substantially parallel to the first elongated beam member, a pair of topping knives that are mounted to the carriage and that are closable for topping a tree that is disposed substantially parallel to the first elongated beam member.

A first flexible tension mechanism that includes a hydraulically driven winch drum and a pair of flexible steel cables is used to reciprocate the second elongated beam member.

A second flexible tension mechanism is longitudinally secured to the first elongated beam member, wraps around a sheave at one end of the second elongated beam member, and is attached to the carriage. A third flexible tension mechanism is longitudinally secured to the first elongated beam member, wraps around a sheave at the other end of the first elongated beam member, and is attached to the carriage.

The second and third flexible tension mechanisms provide constant length flexible attachments between the first elongated beam member and the carriage; so that an increment of movement of the second elongated beam member with respect to the first elongated beam member causes the carriage to move in the same direction for an equal increment of distance on the second elongated beam member.

Both the second and the third flexible tension mechanisms each comprise an essentially endless tension element having two strands that are longitudinally disposed along the second elongated beam member, having a first interconnecting portion in the carriage that wraps around a sheave and interconnects the two strands, and having a second interconnecting portion that wraps around a sheave in the first elongated beam member and that interconnects the two strands.

A first hydraulic cylinder which is fixedly secured with relation to the first elongated beam member provides equal magnitude and opposite direction reciprocating tension movements in the two longitudinally disposed strands of the second flexible tension mechanism. These longitudinal movements in the longitudinally disposed strands of the second flexible tension mechanism are used to open and to close the delimber knives. The third flexible tension mechanism includes a pair of longitudinally disposed strands that are reciprocably actuated by a second hydraulic cylinder that is fixedly secured with relation to the first elongated beam member and that serve to open and to close the topping knives.

Thus, the second flexible tension mechanism mechanically transmits motion from the second elongated beam member to the carriage in one longitudinal direction, and also mechanically transmits motion from the first hydraulic cylinder to the delimber knives; and the third flexible tension mechanism mechanically transmits motion from the second elongated beam member to the carriage in the other longitudinal direction, and also mechanically transmits motion from the second hydraulic cylinder to the topping knives.

The present invention includes automatic control of the processing operation so that the starting of the processing cycle proceeds automatically with the correct positioning of a felled tree onto the processing mechanism; and the tree is topped at a length which depends upon the size of the individual tree. The topping knives close when the AND conditions of minimum tree length and minimum tree diameter are reached, or, when the OR condition of maximum tree length is reached.

An important feature of the present invention is that the carriage and extendable beam member return to their starting positions immediately after the topping operation, saving cycle time over the prior art in which the carriage proceeded on to the maximum tree length position even though a smaller tree had been topped at half the maximum length.

The automatic control of processing is achieved, in the preferred embodiment, by a unique pilot system that provides substantially constant pilot flow to and from each valve actuator. This constant pilot flow to the valve actuators is quite advantageous for use in cold climates where static force pilot systems operate sluggishly, if at all. A further feature of the hydraulic pilot system is that the pilot lines are sized to cooperate with the constant flow feature to provide equal pressure drops on both sides of the valve actuators, thus avoiding erroneous actuation of a valve operator due to unequal back pressures on the two sides of the valve actuator.

The automatic processing cycle is controlled by both hydraulic sequence valves and by cam mechanisms. In particular, the AND logic for topping a tree includes a snowflake cam mechanism that senses three longitudinal positions of the second elongated beam member.

It is a first object of the present invention to provide a flexible tension mechanism that mechanically transmits motion to a movable member that is disposed on a longitudinally moving member.

It is a second object of the present invention to provide a flexible tension mechanism that mechanically transmits longitudinal motion to a first member and that mechanically transmits motion to a second member that is mounted on the first member.

It is a third object of the present invention to provide a flexible tension mechanism that longitudinally moves a first member on a second member at the same relative velocity and in the same direction as the second member is longitudinally moved on a third member, and that selectively and mechanically transmits motion from a fourth member on the third member to a fifth member on the first member.

It is a fourth object of the present invention to provide a tree harvester in which the processing cycle is automatic.

It is a fifth object of the present invention to provide a tree harvester in which the carriage retracts after topping without traversing to the maximum tree length.

It is a sixth object of the present invention to provide a tree harvester in which topping knives close when the AND conditions of minimum tree length and minimum tree diameter are met.

It is a seventh object of the present invention to provide a pilot hydraulic system in which the pilot flow to the valve actuators is substantially continuous.

It is an eighth object of the present invention to provide a pilot hydraulic system in which pilot flow to the valve actuators is substantially continuous, and in which both sides of each valve actuator are subjected to substantially equal back pressures irrespective of temperature caused changes in fluid viscosity.

It is a ninth object of the present invention to provide a snowflake cam mechanism for mechanically performing logic functions.

These and other advantages and objects of the present invention will be readily apparent by referring to the following detailed description wherein:

BRIEF DESCRIPTION OF THE DRAWINGS

FIG. 1 is a side elevation of the tree harvester;

FIG. 2A is a side elevation of the processing mechanism which performs the delimbing and topping operations;

FIG. 2B is a top view of the flexible tension mechanism for reciprocating the extendable beam of FIG. 2A, taken substantially as shown by view line 2B—2B of FIG. 2A;

FIG. 2C is a top view of the carriage and extendible beam of FIG. 2A taken substantially as shown by view line 2C—2C of FIG. 2A;

FIG. 3 is a pictorial perspective view of the flexible tension mechanism which actuates the delimber and topping knives;

FIG. 3A is a partial pictorial perspective view of FIG. 3, showing an alternate construction of a portion thereof;

FIG. 5 is a side elevation of the carriage taken substantially as shown by view line 5—5 of FIG. 4, showing the mechanical mounting of the topping knives;

FIG. 8A is a top view of the snowflake cam mechanism;

FIG. 8B is a side elevation of the snowflake cam mechanism taken substantially as shown by view line 8B—8B of FIG. 8A;

FIG. 8C is a top view of the retracted position cam, taken substantially as shown by view line 8C—8C of FIG. 8B;

FIG. 8D is a top view of the minimum log length cam, taken substantially as shown by view line 8D—8D of FIG. 8B;

FIG. 8E is a top view of the maximum log length cam, taken substantially as shown by view line 8E—8E of FIG. 8B; and FIG. 9 is a time line diagram of the automatic processing cycle.

DESCRIPTION OF THE PREFERRED EMBODIMENT

Introductory Description

Figure 4:
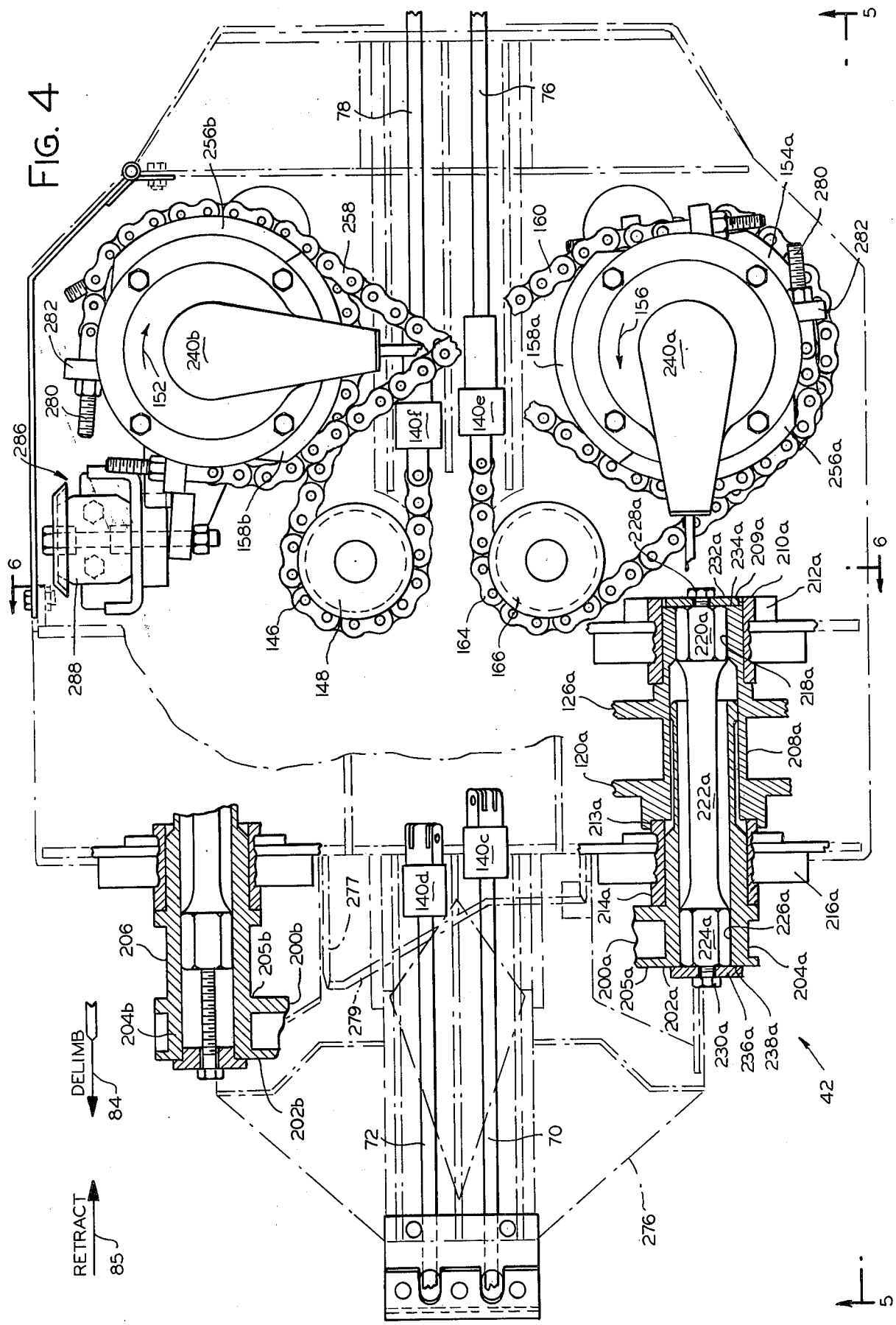
FIG. 4 is a top view of the carriage of FIG. 2A taken substantially as shown by view line 4—4 of FIG. 2A, showing the flexible tension mechanism that actuates the topping knives, and showing the mechanical mounting of the delimber knives.

Referring now to FIG. 1, a tree harvester 10 includes a front section 12 and a rear section 14 that are hinged on a steering axis 16. Two engines (not shown), one mounted in the rear section 14 and the other in the front section 12, deliver power to wheels 18 and 20 and supply power for other machine operations. An operator's cab 22 at the forepart of the front section 12 contains an operator's seat (not shown) and controls (some of which are shown in other figures and will be described later).

The tree harvester 10 includes a tree transfer mechanism 24 which includes a shear 26, a tree grapple 28, a crowd boom 30, a parallel linkage 34, and a felling boom 32.

The tree harvester 10 also includes a tree processing mechanism 36 having a stationary beam or first elongated beam member 38 that is mounted onto the front section 12, having an extendable delimber beam or second elongated beam member 40, and having a delimber and topping carriage or third member 42. The extendable delimber beam 40 is guidably mounted onto the stationary beam 38 for longitudinal movement thereto; and the carriage 42 is guidably mounted to the extendable delimber beam for longitudinal movement thereto.

The tree harvester 10 further includes a tree rack 41 for collecting processed trees or logs, having hinged arms 43 that may be lowered for discharging the processed trees.

Referring now to FIG. 2A, the tree processing mechanism 36 is shown with a tree 44 being longitudinally positioned with respect to the stationary beam 38 and being clamped in position by a processing clamp 46 that extends upwardly from a first end 47 of the stationary beam 38.

Referring now to FIGS. 1, 2A, and 2B, a cable drive drum assembly 48 includes a reversible 2-speed hydraulic motor 50, a winch drum 52, a cable 54, and a cable 56. The cables 54 and 56 are attached to the winch drum 52; and the cables 54 and 56 have ends 58 and 60 respectively that are attached to respective ones of ends 62 and 64 of the extendable delimber beam 40. The cables 54 and 56 are wound onto the winch drum 52 such that counterclockwise rotation of the winch drum 52, as viewed in FIG. 2A, will wind the cable 54 onto the winch drum 52 moving the extendable delimber beam 40 leftwardly in the delimbing direction as indicated by an arrow 84, and at the same time will unwind the cable 56 from the winch drum 52 allowing the aforesaid leftward movement of the extendable delimber beam 40.

The preceding detailed description of the basic machine is included, in similar form, and in more detail, in U.S. Pat. No. 3,905,407 which is included in this specification of the present invention by reference thereto.

The Flexible Tension Mechanisms

Referring now to FIGS. 2A and 2C, the delimber and topping carriage 42 is pulled leftwardly by a second flexible tension mechanism 68 which includes first and second longitudinally disposed strands 70 and 72; and the delimber and topping carriage 42 is actuated rightwardly by a third flexible cable mechanism 74 which includes first and second longitudinally disposed strands 76 and 78.

The second flexible tension mechanism 68 further includes a pair of sheaves 80 and 82 which are disposed proximal to the end 64 of the delimber beam 40 and which rotate on an axis 83 that is orthogonal to the elongation of the delimber beam 40. In like manner, the third flexible tension mechanism 74 includes a pair of sheaves 86 and 88 which are disposed proximal to the end 62 of the delimber beam 40 and which rotate on an axis 89 that is orthogonal to the elongation of the delimber beam 40.

The strands 70 and 72 are secured to the delimber and topping carriage 42 (in a manner which will be subsequently described), extend longitudinally outward to the sheaves 80 and 82, wrap substantially 180 degrees around the sheaves 80 and 82, extend longitudinally inward, and are attached to the stationary beam 38 (in a manner which will be subsequently described). In like manner, the strands 76 and 78 wrap substantially 180 degrees around the sheaves 86 and 88 and extend longitudinally inward, being attached to the carriage 42 and to the stationary beam 38 (as will be subsequently described).

Referring now to FIGS. 2A, 2B, and 2C, rotation of the winch drum 52 in a counterclockwise direction, as viewed in FIG. 2A, winds the cable 54 onto the winch drum 52 shortening the cable 54 and moving the delimber beam 40 leftwardly in the delimb direction as shown by an arrow 84; and this leftward movement of the delimber beam 40 results in portions of the strands 70 and 72 being pulled around the sheaves 80 and 82 between the stationary beam 38 and the extendable delimber beam 40, pulling the delimber and topping carriage 42 leftwardly in the delimb direction of the arrow 84 at the same relative velocity with respect to the delimber beam 40 as the delimber beam 40 is moving with respect to the stationary beam 38. In like manner, when the delimber beam 40 is moved rightwardly in the retract direction, as shown by arrow 85, by shortening of the cable 56, the strands 76 and 78 are pulled around respective ones of the sheaves 86 and 88 moving the delimber and topping carriage 42 rightwardly.

Referring now to FIG. 3, a pictorial perspective view of the tree processing mechanism 36 is shown. A box 90 is used to represent the stationary beam 38 and other parts of the tree processing mechanism 36 which are stationary with respect to the stationary beam 38. Above the box 90, the extendable delimber beam 40 is pictorially represented with a portion intermediate of the ends 62 and 64 being broken out to more clearly show the delimbing and topping mechanisms. Above the delimber beam 40, a box 92 pictorially represents the delimber and topping carriage 42 and includes both a portion of a delimber mechanism 94 and a portion of a topping mechanism 96. The delimber mechanism 94 includes movable delimber knives 98a and 98b having delimber knife blades 99a and 99b and delimber knife shafts 118a and 118b, a hydraulic cylinder or fluid actuator 100, and the second flexible tension mechanism 68, portions of which are included in the boxes 90 and 92 and other portions of which include the strands 70 and 72 that wrap around the sheaves 80 and 82.

The topping mechanism 96 includes movable topping knives 109a and 109b having topping blades 104a and 104b and topping knive shafts 150a and 150b, a hydraulic cylinder or fluid actuator 106 which is located in the box 90, and the third flexible tension mechanism 74, portions of which are in the boxes 90 and 92, and a portion of which includes the strands 76 and 78 that wrap around the sheaves 86 and 88.

Referring again to FIG. 3, when a piston rod 101 of the fluid actuator 100 moves in the direction of the arrow 108, a chain connector lug 102 moves a chain 103, moving the strand 72 in the direction of an arrow 110 pulling a chain 112 around sheaves 114 and 116 and rotating the delimber knife shaft 118b in a closing direction as shown by an arrow 122 by pulling on an arcuate segment 120b which extends radially outward from the delimber knife shaft 118b.

At the same time, rotation of the delimber knife shaft 118b as shown by the arrow 122 causes rotation of the delimber knife shaft 118a in the closing direction as shown by an arrow 124 through a connection between the delimber knife shafts 118a and 118b which includes arcuate segments 126a and 126b which are interconnected by a chain 128.

It is important to notice that actuation of the chain 103 by the actuator 100 in the direction of the arrow 108 is effective to pull the strand 72 in the direction of the arrow 110 closing the delimber knives 98a and 98b; and the closing of the delimber knives 98a and 98b is effective to move the strand 70 in the direction of an arrow 132 because of the action of an arcuate segment 120a which extends radially outward from the delimber knife shaft 118a, the segment 120a pulling a chain 134 around sheaves 136 and 138 to pull the strand 70 in the direction of the arrow 132.

In like manner, movement of the fluid actuator 100, producing movement of the chain 103 results in equal increment an opposite direction movements of tension connectors 140a and 140b as the chain 103 wraps around sheaves 142a, 142b, 142c, and 142d.

Thus it can be seen that actuation of the fluid actuator 100 is effective to close and to open the delimber knives 98a and 98b but that the length of the strands 70 and 72, which interconnect the boxes 90 and 92 remain the same; since, when the strand 72 is lengthened in the box 92 it is shortened in the box 90, and when the strand 70 is shortened in the box 92 it is lengthened in the box 90.

In other words, the second flexible tension mechanism 68 functions as an endless flexible tension element in which motion is transmitted from the box 90 to the box 92 by relatively positioning this endless flexible tension element around anchoring sheaves, such as the sheaves 142a and 136, which are located in respective ones of the boxes 90 and 92; and, since this endless flexible tension element remains the same length without regard to its relative positioning around respective ones of sheaves 142a and 136 in the boxes 90 and 92, this endless flexible tension element can be used to mechanically transmit motion to the delimber knives 98a and 98b in the manner as previously described.

In like manner, movement of a piston rod 105 of the fluid actuator 106 and a chain connector lug 107 in a direction as shown by an arrow 144 is effective to pull a chain 145 around sheaves 149a and 149b, pulling the strand 78 in a direction as shown by an arrow 147, pulling a chain 146 around a sheave 148 and rotating a topping knife shaft 150b in the opening direction as shown by an arrow 152 by interaction between the chain 146 and an arcuate segment 154b which extends radically outward from the topping knife shaft 150b.

At the same time, a topping knife shaft 150a is actuated in the opening direction as shown by an arrow 156 by tension forces which are transmitted from an arcuate segment 158a to an arcuate segment 158a by a chain 160; and the strand 76 is pulled in the direction of an arrow 162 by a segment 154a pulling a chain 164 around a sheave 166.

Thus it can be seen that the third flexible tension mechanism 74, which includes the longitudinally disposed strands 76 and 78, functions as an endless tension element in the same manner as has been described for the second flexible tension mechanism 68; and the third flexible tension mechanism 74 is effective not only to transmit opening and closing motions from the fluid actuator 106 to the topping knife shafts 150a and 150b, but also to transmit longitudinal movement to the delimber and topping carriage 42, as depicted by the box 92, as the delimber beam 40 moves rightwardly.

In summary, the second flexible tension mechanism 68 is effective to actuate the delimber and topping carriage 42, as depicted by the box 92 in the delimb direction as shown by the arrow 84 in response to and in accordance with movement of the delimber beam 40 in the delimb direction; and, the second flexible tension mechanism 68 is effective to transmit opening and closing motions from the fluid actuator 100 to the delimber knives 98a and 98b selectively concurrent with and independent of movements of the delimber beam 40 and the carriage 42 in the delimb direction as indicated by the arrow 84 or in the retract direction as indicated by the arrow 85.

In like manner, the third flexible tension mechanism 74 is effective to move the delimber and topping carriage 42, as indicated by the box 92, in the retract direction as shown by the arrow 85 in response to movement of the delimber beam 40 in the retract direction; and the third flexible tension mechanism 74 is effective to transmit opening and closing motions from the fluid actuator 106 to the topping knives 104a and 104b selectively concurrent with and independent of movements of the delimber beam 40 and the carriage 42 in either direction.

The chain 103 serves as a means for interconnecting ends 168a and 170a of the strands 70 and 72; and the chains 112, 128, and 134 serve as means of interconnecting ends 168b and 170b of the strands 70 and 72; so that the strands 70 and 72 and the chains 112, 128, and 134 cooperate to function as an endless flexible tension element. The means for interconnecting the ends 168a and 170a also includes the sheave 142a which is rotatably mounted onto a pivot pin 143a that is secured orthogonally to the stationary beam 38, as represented by the box 90, by a journalling bracket 141a.

In like manner, the strands 76 and 78 are connected to function as an endless tension element by the chain 145 and by the chains 146, 160, and 164.

This effective forming of endless tension elements also includes sheaves, shafts, and segments, such as the sheave 114, the delimber knife shaft 118a, and the segment 120a which cooperate to interconnect adjacent ones of the strands, such as the strands 70 and 72, and to mechanically transmit motion from one strand to another.

Referring now to FIG. 3A, an alternate means for interconnecting the strands 70 and 72 includes chains 159a and 159b that replace the chain 103, and a pivoted beam 161 that replaces the sheaves 142a and 142b that is pivotally mounted to the stationary beam 38 (as represented by the box 90) by a pivot pin 163 and a bracket 165. Thus it will be apparent to one skilled in the art that a pivoted mechanical arm device, such as the pivoted beam 161 may be used to replace a sheave and chain for interconnecting strands of the flexible tension elements, or for changing the direction of mechanical motions of a chain or a strand.

Mechanical Details

Figure 6:
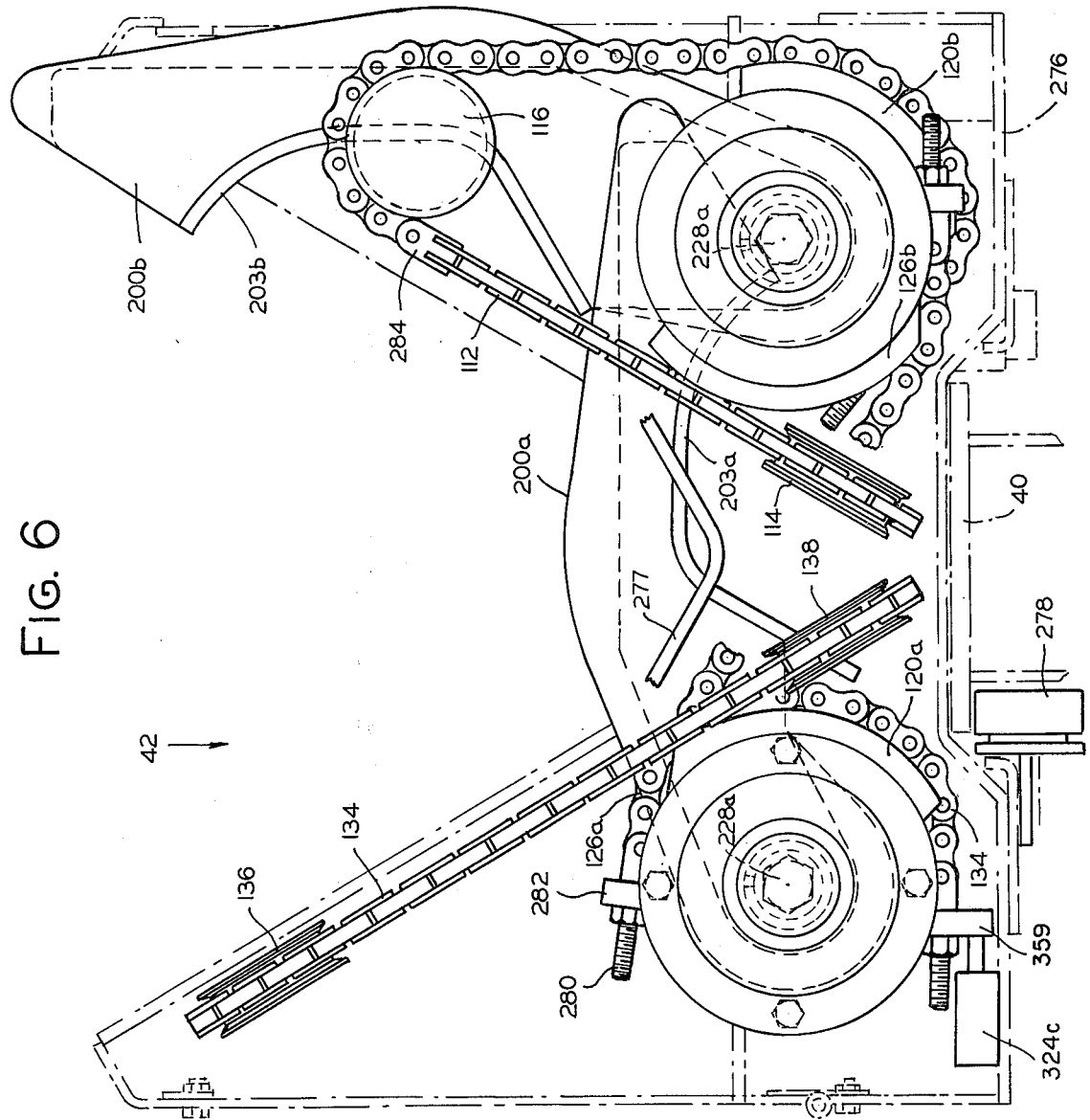
FIG. 6 is an end elevation of the carriage, taken substantially as shown by view line 6—6 of FIG. 4.

Referring now primarily to FIGS. 4–6, the delimber and topping carriage 42 of FIGS. 1, 2A, and 2C which is pictorially illustrated as the box 92 of FIG. 3, is shown in greater detail in FIGS. 4–6. For simplicity of understanding, the same part numbers are used in FIGS. 4–6 as are used for pictorially illustrating parts in FIG. 3 even though the actual mechanical configurations of the parts in FIGS. 4–6 vary somewhat from the pictorial illustration of FIG. 3. An exception to this numbering procedure is the numbering of the delimber and topping knives in which the divergence in mechanical construction from that of the pictorial illustration of FIG. 3 requires different numbering.

Referring now to FIGS. 4–6, and more particularly to FIG. 4, the delimber and topping carriage 42 includes movable delimber knives 200a and 200b which comprise delimber knife blades 202a and 202b and tubular delimber knife shafts 204a and 204b. The delimber knife shafts include curved cutting edges 203a and 203b (FIG. 6), include ends 205a and 205b that are attached to the tubular delimber knife shafts 204a and 204b, and extend orthogonally outward from the shafts 204a and 204b.

Referring now to FIG. 4, the delimber knife shaft 204b includes a lengthened neck portion 206 so that the delimber knife 200b is staggered ahead of and precedes the delimber knife 200a in the delimbing process. Otherwise the construction and mounting of the delimber knives 200a and 200b are identical so that a description for one will suffice.

Referring again to FIG. 4, a delimber knife hub 208a includes the segments 120a and 126a which are pictorially represented in the FIG. 3 illustration. The delimber knife hub 208a is journalled at one end thereof in an inside cylindrical surface 209a of an inner race 210a of a flanged bearing 212a; and the delimber knife hub 208a is journalled at the other end thereof on an outside cylindrical surface 213a of an inner race 214a of a flanged bearing 216a. The delimber knife hub 208a includes a hexagonal bore portion 218a, and receives a hexagonal portion 220a of a torque rod 222a. The torque rod 222a includes a second hexagonal portion 224a that is drivingly inserted into a hexagonal bore portion 226a of the tubular delimber knife shaft 204a.

The delimber knife 200a is retained within the delimber knife hub 208a by bolts 228a and 230a which screw into respective ones of the hexagonal portions 220a and 224a clamping a washer 232a against an end 234a of the hub 208a, and clamping a washer 236a against a surface 238a of the tubular delimber knife shaft 204a. Thus it is possible to remove the delimber knife 200a by removing only the bolt 228a and the washer 232a without loosening the chains 103, 112, 128, and 134 (FIGS. 3 and 6).

Referring now to FIG. 5, the mounting of a movable topping knife 240a is typical of the mounting of both topping knives 240a and 240b (FIG. 4) so that a description of one will suffice for both.

The topping knife 240a includes a topping knife blade 242a having a cutting edge 244a, and a topping knife shaft 246a having a hexagonal portion 247a that is drivingly inserted into a hexagonal bore portion 249a of a topping knife hub 248a. The topping knife hub 248a also includes a cylindrical bore portion 250a which receives the topping knife shaft 246a and which provides journalling support for a guide portion 252a of the topping knife shaft 246a.

The topping knife hub 248a includes the segments 154a and 158a which are pictorially represented in FIG. 3 and also a third arcuate segment 256a which is pictured in FIG. 3 and which cooperates with an arcuate segment 256b and with a chain 258 in FIG. 3 to further synchronize the rotational movements of the topping knife shafts 150a and 150b of FIG. 3.

The topping knife hub 248a is journalled by a top cylindrical surface 260a that is fitted inside an inner race 262a of a flanged bearing 264a; and the hub 248a is journalled by a bottom cylindrical surface 266a that is fitted inside an inner race 268a of a flanged bearing 270a.

The topping knife 240a is held inside the hub 248a by a bolt 272a that screws into the topping knife shaft 246a and that clamps a washer 274a against an end 275a of the hub 248a.

Thus the topping knife 240a can be removed from the hub 248a by removal of the bolt 272a without loosening the chains 145, 146, 160, 164, and 258 of FIG. 3, thereby facilitating replacement of dulled topping knives.

Referring again to FIG. 5, the delimber and topping carriage 42 generally comprises a frame 276 having a plurality of rollers 278 mounted thereto that guidingly engage the delimber beam 40 of FIGS. 1 and 6.

Referring now to FIGS. 4–6, the carriage 42 includes a stationary or bottom delimber knife 277 that includes a cutting edge 279. The delimber knife 200a of FIG. 6 is shown in the fully closed position proximal to the bottom delimber knife 277; whereas the delimber knife 200b is shown in the fully opened position. In like manner, the topping knife 240a of FIG. 4 is shown in the fully opened position whereas the topping knife 240b is shown in the fully closed position.

Figure 4A:
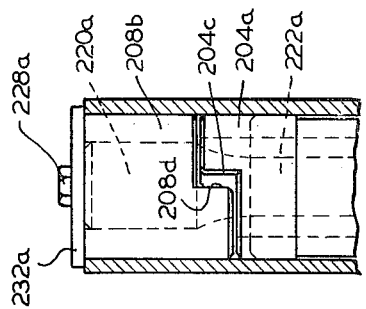
FIG. 4A is a detail of FIG. 4 showing a preferred embodiment for the coupling between the delimber knives and the carriage.

In a preferred embodiment of the present invention as shown in FIG. 4A, the delimber knife hub 208a may be provided with an internal split collar 208b about torque rod 222a which is engageable with the delimber knife shaft 204a to protect the torque rod 222a from overwinding when the delimber knives 200a,b refuse to close due to encountering an obstruction.

The collar 208b, received in an outer end of the hub 208a is held in place by bolt 228a which screws into the end of a hexagonal portion 220a of the torsion bar 222a, clamping a washer 232a against an outer surface of the hub 208a and the split collar 208b. Complementary stepped surfaces 204c of the shaft 204a and 208d of the collar 208b are spaced apart when the delimber knives 200a,b are operating normally. When the delimber knives 200a,b encounter an obstruction, surfaces 204c,208d approach each other as the torque rods 222a are loaded. If the obstruction is sufficiently large, surfaces 204c,208d engage each other to prevent further winding, thus protecting torque rods 222a from permanent damage.

It will be appreciated by those skilled in the art that the FIG. 3 pictorial illustration is generally faithful in depicting the operation of the mechanism of FIGS. 4–6; and a person skilled in the art will readily recognize such mechanical features as threaded chain connectors 280, chain attaching lugs 282, a chain connector 284 for changing the plane of allowable bending, and a stop assembly 286 for the topping knives 240a and 240b that includes a rubber stop bumper 288. Also the use of common numbers for the designation of like parts in the pictorial illustration of FIG. 3 and the actual mechanical drawings of FIGS. 4–6 make easy the understanding of the illustrations of FIGS. 4–6 by reading the detailed description of FIG. 3. Thus it is unnecessary to separately describe the operation of the mechanism of FIGS. 4–6.

The Hydraulic Systems

Figure 7A:
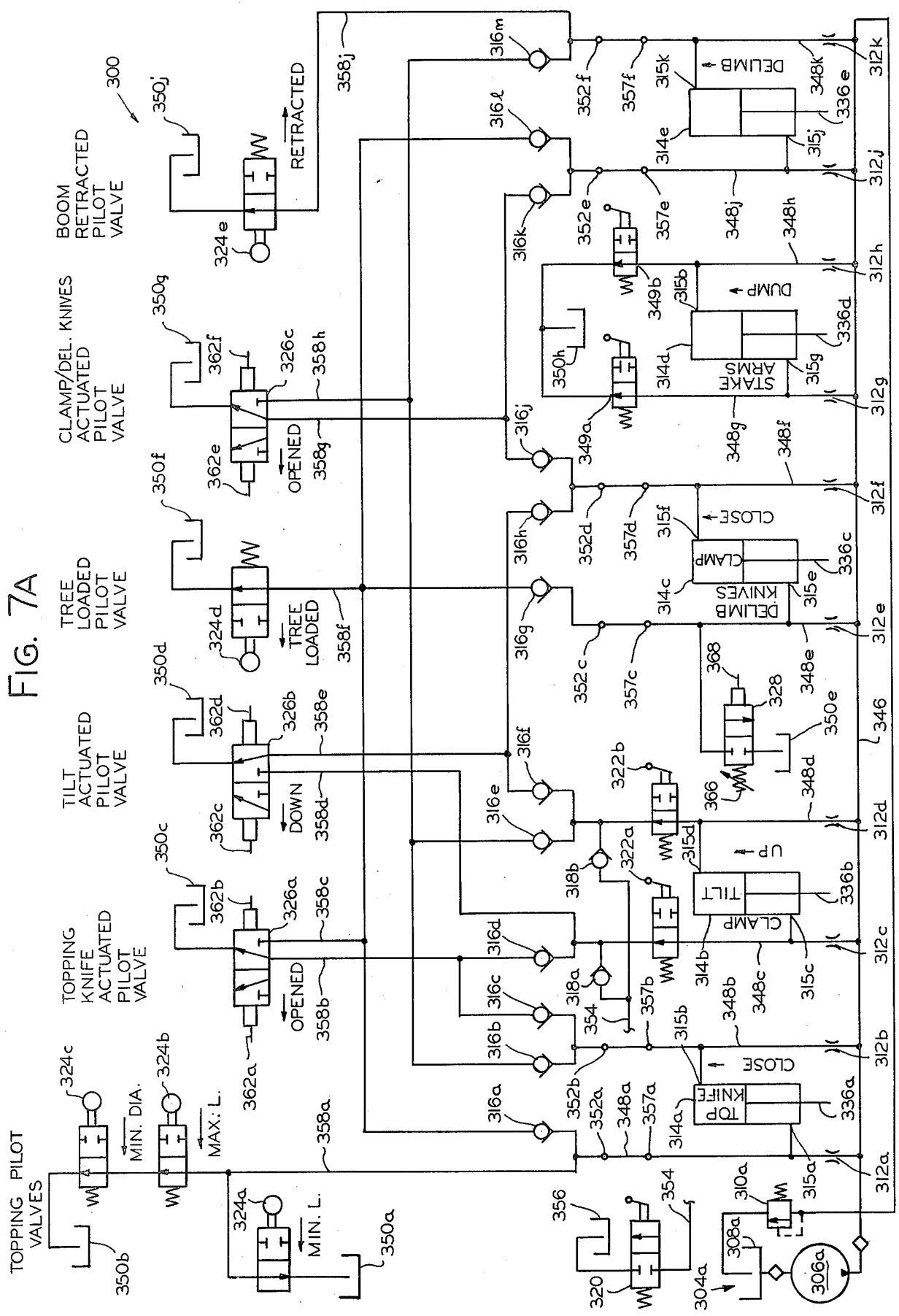
FIG. 7A is a schematic drawing of the hydraulic pilot control system.
Figure 7B:
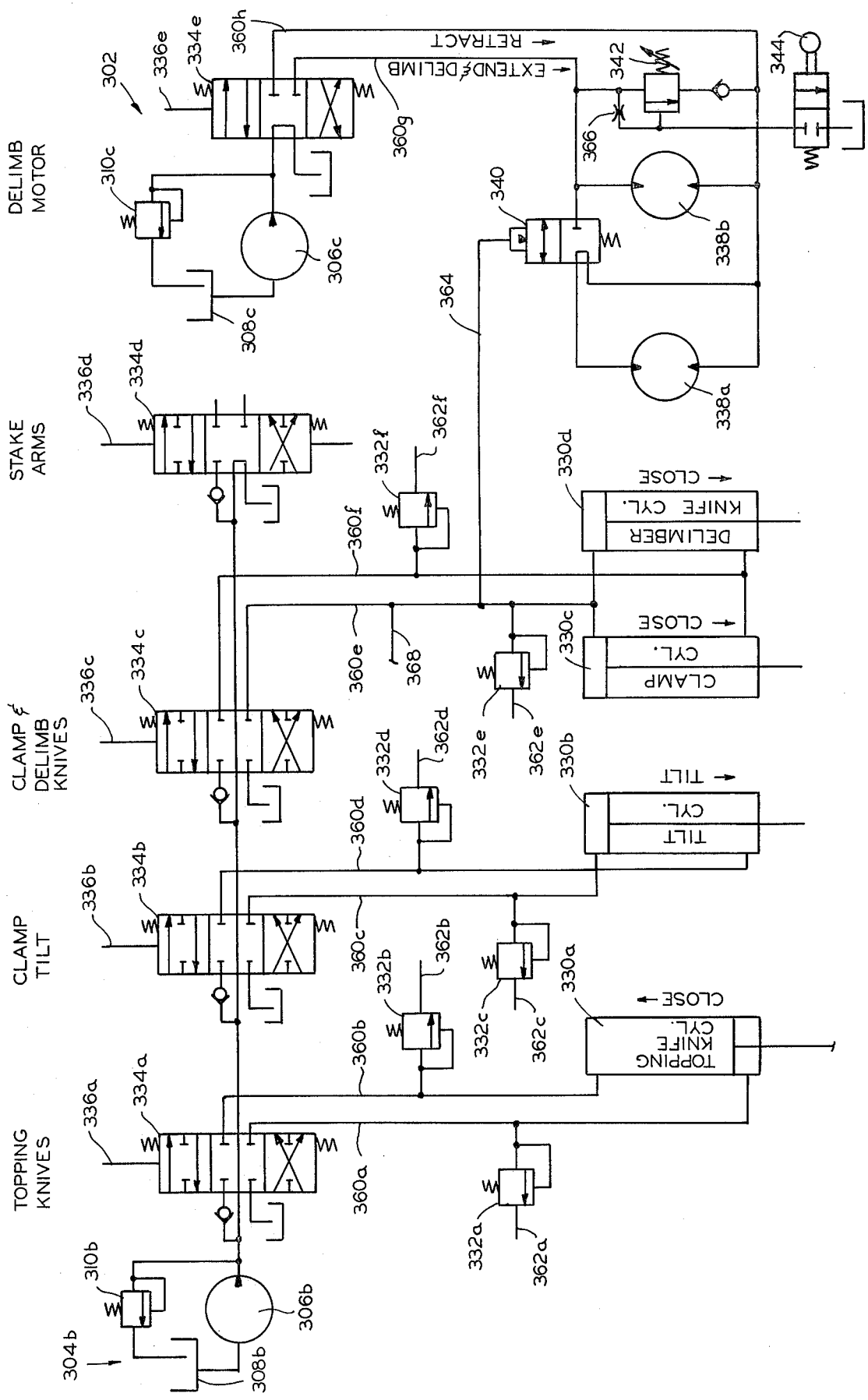
FIG. 7B is a schematic drawing of the hydraulic power system.

Referring now to FIGS. 7A and 7B, FIG. 7A is a schematic drawing of a hydraulic pilot control system 300 which controls a hydraulic power system 302 of FIG. 7B, the hydraulic actuating system 302 operating the tree harvester 10 of FIG. 1.

The systems 300 and 302 include a plurality of each of several types of components. All components of a given type, or of a given use, are designated by a common number; and the individual component of a given type, or function, is further designated by an individual suffix letter. The suffix letters are generally in alphabetical order proceeding from left to right for easy location of individual components as recited in the description.

Referring now to FIG. 7A, the system 300 includes a source of pressurized fluid 304a having a pump 306a and a sump 308a, a pressure relief valve 310a, pilot restrictors 312, valve actuators 314, check valves 316, check valves 318, an override pilot valve 320, manual operation pilot valves 322, mechanically actuated pilot valves 324, pilot actuated pilot valves 326 each having two fluid actuators, and an adjustable pressure pilot valve 328.

Referring now to FIG. 7B, the hydraulic actuating system 302 includes, in addition to some of the same types of components as recited for the system 300, hydraulic cylinders or fluid actuators 330, sequence valves 332, spring centered directional control valves 334 that are mechanically connected to piston rods 336 of respective ones of the valve actuators 314, fluid actuators or reversible fluid motors 338, a pilot operated directional control valve 340, an adjustable pressure relief valve 342, and a mechanically actuated pilot valve 344.

Referring now again to FIGS. 7A and 7B, the general operation of the systems 300 and 302 is as follows: The directional control valves 334 move to their respective spring centered positions, as shown, moving the valve actuators 314 to the centered positions, as shown, because of the interconnecting of the directional control valves 334 and the valve actuators 314 by the piston rods 336.

The pump 306a supplies pressurized fluid to a pilot supply conduit 346, supplying fluid to pilot conduits 348 via respective ones of the restrictors 312. The fluid that is supplied to the conduits 348 is exhausted to respective ones of sumps 350, preventing a build-up of fluid pressure in any of the pilot conduits 348.

Blocking of the fluid flow to one of the sumps 350 by one of the pilot valves 324 or 326 causes a build-up of fluid pressure in a respective one of the conduits 348, moving one of the piston rods 336 either upwardly or downwardly depending upon which of the conduits is blocked.

Automatic control of the pilot hydraulic system 300, by the pilot valves 324 and 326, can be manually overridden as follows: A plurality of check valves 318, two of which are shown, and others of which are represented by dots 352, are attached to each of the pilot conduits 348, and are connected to the override pilot valve 320 by an override conduit 354; so that manually actuating the pilot valve 320 will bleed pilot fluid in the pilot conduits 348 to a sump 356, canceling any build-up in fluid pressure in any of the conduits 348 as caused by any of the pilot valves 324 or 326.

Then, the system 300 can be manually actuated by selectively actuating various ones of manually actuated pilot valves, such as the pilot valves 322a and 322b, or other pilot valves as represented by dots 357.

The dumping of the bunk 41 (FIG. 1) by lowering the hinged arms 43 is manually controlled by manually actuating a pilot valve 349a; and the hinged arms 43 are raised by manually actuating a pilot valve 349b.

Referring now to FIGS. 7A, 7B, and 9, at the start of an automatic processing cycle, the various components are in the positions as shown in FIGS. 7A and 7B, the extendable beam 40 of FIG. 2A being in the retracted position and no tree being positioned on the tree processing mechanism 36 of FIG. 2A.

When a tree 44 (FIG. 2A) is loaded onto the processing mechanism 36, the tree loaded pilot valve 324d is moved rightwardly blocking the flow of fluid from the pilot conduit 348e to the sump 350f, moving the piston rod 336c and the directional control valve 334c upwardly to direct fluid from a pump 306b to the clamp cylinder 330c and to the delimber knife cylinder 330d via a conduit 360e, so that the clamp cylinder 330c and the delimber knife cylinder 330d are moved to their respective clamp closed and delimber knife closed positions.

As the processing clamp 46 (FIG. 2A), and the delimber knives 98a and 98b (FIG. 3), engage the tree 44 (FIG. 2A) fluid pressure builds up in the conduit 360e actuating the sequence valve 332e and pressurizing a pilot conduit 362e. The fluid pressure in the pilot conduit 362e then actuates the clamp actuated pilot valve 326c rightwardly blocking fluid communication from the pilot conduit 358g to the sump 350g and opening fluid communication from the pilot conduit 358h to the sump 350g.

Opening fluid communication from the pilot conduit 358h to the sump 350g is preparatory to future actuation of the valve actuators 314a, 314b, and 314e.

The closing of the pilot conduit 358g by the clamp pilot valve 326c is effective to pressurize the pilot conduit 348j, pressurizing fluid therein and forcing the piston rod 336e of the valve actuator 314e upwardly, moving the directional control valve 334e upwardly and directing pressurized fluid from the pump 306c to the fluid motor 338b via the conduit 360g, driving the motor 338b in the delimb direction. Pressurized fluid from the pump 306c is also delivered to the fluid motor 338a during the delimb operation because of the connection of the directional control valve 340 to the conduit 360e via a conduit 364, and the resultant downward actuating of the directional control valve 340.

When the delimbing process proceeds to a point wherein the topping blades 104a and 104b (FIG. 3) pass a predetermined minimum log length position, the pilot valve 324a is actuated leftwardly closing communication of a conduit 358a with the sump 350a, and, when the delimbing process further proceeds to a point wherein the diameter of the log has decreased to a predetermined minimum diameter, the pilot valve 324c is actuated leftwardly, by finger 359 of FIG. 6, closing communication of the pilot conduit 358a to the sump 350b. In like manner, if the topping blades 104a and 104b (FIG. 3) have reached a point wherein the topping blades 104a and 104b are at a predetermined maximum log length position, then the minimum log length pilot valve 324a will already be closed blocking fluid communication from the pilot conduit 358a to the sump 350a, and the maximum log length pilot valve 324b will close, blocking fluid communication from the pilot conduit 358a to the sump 350b.

Blocking of the pilot conduit 358a initiates the topping operation by pressurizing the conduit 348a, moving the piston rod 336a and the directional control valve 334a both upwardly, directing pressurized fluid from the pump 306b to the topping knife cylinder 330a via the conduit 360a.

When the topping blades 104a and 104b (FIG. 3) reach their maximum closed positions, fluid pressure in the conduit 360a builds up actuating the sequence valve 332a and pressurizing the conduit 362a. Pressurized fluid in the conduit 362a actuates the topping knife actuated pilot valve 326a rightwardly opening fluid communication from the pilot conduit 358c to the sump 350c and blocking fluid communication from the pilot conduit 358b to the sump 350c.

Opening of the pilot conduit 358c is effective to bleed the fluid pressure from the pilot conduit 348a, allowing the topping knife valve actuator 314a and the directional control valve 334a to center, holding the topping knife cylinder 330a in the closed position. Opening of the pilot conduit 358c is also effective to bleed pressure from the pilot conduit 348c, allowing the clamp and delimber knife valve actuator 314c and the directional control valve 334c to center, and is also effective to bleed fluid pressure from the pilot conduit 348j, allowing the delimb motor valve actuator 314e and the directional control valve 334e to center, stopping rotation of the fluid motors 338a and 338b.

Closing of the pilot conduit 358b by the topping knife actuated pilot valve 326a is effective to pressurize the pilot conduit 348c, moving both the piston rod 336b of the tilt valve actuator 314b, and the directional control valve 334b upwardly supplying pressurized fluid from the pump 306b to the tilt cylinder 330b via the conduit 360c, tilting the arm assembly 370 of the processing clamp 46 (FIG. 2A) upwardly.

When the tilt cylinder 330b has reached the end of its stroke, fluid pressure in the conduit 360c builds up, opening the sequence valve 332c and pressurizing the pilot conduit 362c. Pressurized fluid in the pilot conduit 362c is effective to actuate the tilt actuated pilot valve 326b rightwardly opening fluid communication from the conduit 358d to the sump 350d and blocking fluid communication from the pilot conduit 358e to the sump 350d.

Opening of fluid communication from the pilot conduit 358d to the sump 350d is effective to relieve fluid pressure in the pilot conduit 348c allowing the tilt cylinder valve actuator 314b and the directional control valve 334b to center, blocking the tilt cylinder 330b in the tilt up position.

Blocking of fluid flow from the pilot conduit 358e to the sump 350d by the pilot valve 326b is ineffective to block the pilot conduit 348d because of communication of the pilot conduit 348d with the sump 350g via the check valve 316e and the conduit 358h; however, blocking of the pilot conduit 358e by the tilt actuated pilot valve 326b is effective to pressurize the pilot conduit 348f actuating the piston rod 336c of the clamp and delimber knife valve actuator 314c downwardly, moved the directional control valve 334c downwardly and directing pressurized fluid from the pump 306b to the clamp cylinder 330c, and to the delimber knife cylinder 330d, via a conduit 360f.

As the clamp cylinder 330c and the delimber knife cylinder 330d move upwardly toward respective ones of their clamp open and delimber knife open positions, the processed log of the tree 44 (FIG. 2A) is gravity dumped into the bunk 41 (FIG. 1); and the pilot valve 324d is spring actuated leftwardly, opening pilot conduits 348a, 348e, and 348j to the sump 350f.

When the cylinders 330c and 330d reach their maximum open positions, pressurized fluid in the conduit 360f builds up opening the sequence valve 332f and pressurizing the pilot conduit 362f. Pressurized fluid in the conduit 362f is effective to actuate the clamp actuated pilot valve 326e leftwardly opening fluid communication from the pilot conduit 358g to the sump 350g and blocking fluid communication from the pilot conduit 358h to the sump 350g. Opening fluid communication from the pilot conduit 358g to the sump 350g is effective to open the pilot conduit 348f, allowing the clamp and delimber knife valve actuator 314c and the directional control valve 334c to center, and is effective to open the pilot conduit 348j to the sump 350g.

Blocking of the pilot conduit 358h is effective to block the pilot conduit 348k (the conduit 358j being blocked by the extendable beam 40 (FIG. 2A) being away from the retracted position and thereby allowing pilot valve 324e to close), so that the piston rod 336e of the delimb motor valve actuator 314e is moved downwardly, moving the directional control valve 334e downwardly, directing pressurized fluid from the pump 306c to the reversible fluid motor 338b via the conduit 360h, and retracting the extendable beam 40 (FIG. 2A). At this time, the conduit 364 is not pressurized and so the directional control valve 340 is in the position shown, allowing the fluid motor 338a to freely rotate and recirculate fluid without being pressurized.

Blocking fluid communication from the pilot conduit 358h to the sump 350g by the pilot valve 326c is also effective to pressurize the pilot conduit 348b, forcing the piston rod 336a of the topping knife valve actuator 314a downwardly toward the topping knife open position, and actuating the directional control valve 334a downwardly to direct pressurized fluid from the pump 306b to the topping knife cylinder 330a via the conduit 360b to open the topping blades 104a and 104b (FIG. 3).

Blocking of the pilot conduit 358h by the clamp actuated pilot valve 326c is additionally effective to pressurize the pilot conduit 348d, forcing both the piston rod 336b of the tilt cylinder valve actuator 314b and the directional control valve 334b downwardly. However, the directional control valve 334b is unable to supply pressurized fluid to the tilt cylinder 330b, because the directional control valves 334a and 334b are series connected, and the control valve 334a is also in the down position, precluding pressurized fluid from the pump 306b being supplied to the control valve 334b.

When the topping knife cylinder 330a reaches the end of its opening stroke, fluid pressure in the conduit 360b builds up, opening the sequence valve 332b and pressurizing the pilot conduit 362b. Pressurized fluid in the conduit 362b moves the topping knife actuated pilot valve 326a leftwardly opening fluid communication from the pilot conduit 358b to the sump 350c and blocking fluid communication from the pilot conduit 358c to the sump 350c.

Opening fluid communication from the pilot conduit 358b to the sump 350c is effective to relieve pressurized fluid in the pilot conduit 348b allowing the topping knife valve actuator 314a and the directional control valve 334a to center; so that the directional control valve 334b, which is still in the down position, now receives pressurized fluid from the pump 306b and supplies pressurized fluid to the tilt cylinder 330b via the conduit 360d, actuating the tilt cylinder 330b downwardly to the tilt down position, lowering the cradle 370 (FIG. 2A) to the initial position thereof.

When the tilt cylinder 330b reaches the end of its stroke, fluid pressure in the conduit 360d builds up, actuating the sequence valve 332d, and supplying pressurized fluid to the conduit 362d which actuates the pilot valve 326f leftwardly.

Actuation of the pilot valve 326b leftwardly is effective to open fluid communication from the pilot conduit 358e to the sump 350d, relieving fluid pressure in the conduit 348d, and allowing both the tilt cylinder valve actuator 314b and the control valve 334b to recenter.

During the opening of the topping blades 104a and 104b (FIG. 3), and during the tilting downwardly of the cradle 370 (FIG. 2A), the extendable beam 40 (FIG. 2A) has been retracting. As the extendable beam 40 reaches the retracted position, the pilot valve 324e is mechanically actuated, opening the pilot conduit 358j, allowing the delimb motor valve actuator 314e and the control valve 334e to recenter, stopping the fluid motor 338b.

One operating cycle has now been completed and all components are back to the positions as pictured in FIGS. 7A and 7B.

The adjustable pressure pilot valve 328 functions to adjustably limit, by manual adjustment of a spring 366, the maximum clamping pressure of the processing clamp 46 (FIG. 2A) and the maximum closing pressure of the delimber knives 98a and 98b (FIG. 3). A conduit 368 applies the closing pressure of the clamp cylinder 330c, and of the delimber knife cylinder 330d, to the pilot valve 328, bleeding pilot fluid from the pilot conduit 348e to the pump 350e, thereby allowing the clamp and delimber valve actuator 314c and the control valve 334c to move toward their spring centered positions, and thereby stopping the build-up of clamp closing and delimber knife closing fluid pressure.

It should be noted that both of the fluid motors, 338a and 338b, are pressurized for the delimbing process, providing a higher delimbing force to the extendable beam 40 of FIG. 2A, but moving it at a slower velocity (it being understood that both of the fluid motors, 338a and 338b of FIG. 7B, are represented as the fluid motor 50 of FIG. 2A); but only the fluid motor 338b is pressurized for the retracting operation, providing a higher retracting velocity to save cycle time.

The hydraulic pilot system 300 supplies fluid from the source 304a to a pair of ports 315 of each of the valve actuators 314 via a respective pair of the pilot conduits 348 and a respective pair of the fluid restrictors 312. The conduits 348 are normally open to respective ones of the sumps 350 via respective ones of the conduits 358, providing constant flow of fluid past the ports 315, before the start of and during a portion of each cycle, to warm the fluid in the conduits 348 and 358 and thereby to reduce viscous caused pressure losses in the conduits 348 and 358.

Also, each of the pilot conduits, 348 and 358, are preferably sized so that respective ones of the conduits 348 and 358 provide substantially equal viscous restrictions from the ports 315 of a given valve actuator 314 to the sumps 350; so that the ports 315 of a given valve actuator 314 are subjected to equal back pressures irrespective of fluid temperatures or fluid viscosities, thereby avoiding erroneous actuation of any of the valve actuators by unequal back pressures.

In addition, the fluid actuators 314 are preferably of the equal area type in which the piston rod 336 extends through both ends of the valve actuator 314, as shown by the piston rod 336e of the valve actuator 314e.

The illustrations of FIGS. 7A and 7B and the detailed descriptions thereof, show and recite a number of separate sumps. It should be clearly understood that the showing and reciting of separate sumps is for the purpose of clarity in obviating the illustrating of long return conduits, just as electrical diagrams illustrate ground connections for the same purpose.

The principles of the hydraulic pilot system 300 are shown and described in more basic form in a copending patent application of common filing date and common assignee, the entire specification of which is included herein by reference thereto.

The Cam Mechanism

Referring now to FIGS. 8A and 8B, a snowflake cam mechanism 400 includes a plurality of cams, generally designated 402, a camshaft 404 which is journalled with a rotational axis 406 thereof orthogonal to the elongation of the extendable beam 40 (FIG. 2A) by bearings 408a and 408b, and a multi-lobed actuator 410 which includes fingers 412a, 412b, and 412c that extend radially outward from the camshaft 404 at equiangular circumferential positions around the camshaft 404 and that are generally disposed in a plane 414 that is orthogonal to the rotational axis 406. The multilobed actuator 410 also includes fingers 412d, 412e, and 412f that are disposed in a plane 416 that is orthogonal to the rotational axis 406 and that is displaced longitudinally along the rotational axis 406 from the plane 414, the fingers 412d, 412e, and 412f being interposed between respective ones of the fingers 412a, 412b, and 412c at equiangular locations.

Referring now to FIGS. 8B-8E, the snowflake cam mechanism 400 includes a retracted position cam 418 which actuates the beam retracted pilot valve 324e of FIG. 7A, a minimum log length cam 420 which actuates the minimum log length pilot valve 324a of FIG. 7A, and a maximum log length cam 422 which actuates the maximum log length pilot valve 324b of FIG. 7A.

Referring now to FIGS. 8A-8E, in operation, the extendable beam 40 moves from the retracted position, as shown, in the delimb direction as indicated by the arrow 84, rotating the multi-lobed actuator 410 in a counterclockwise direction, as viewed in FIG. 8A, by interaction of the cam 402b and the finger 412a, the finger 412a being positioned one-sixth of a turn to the rotational position as shown for the finger 412e. Thus, the movement of the extendable beam 40 from the retracted position is effective to rotate the retracted position cam 418 from the position shown to a position wherein the portion of the cam 418 that is intercepted by a line 424a lines up with a cam roller 426a of the beam retracted pilot valve 324e, allowing the pilot valve 324e to shift rightwardly, blocking fluid flow through the pilot valve 324e.

Now the finger 412d, which is in the plane 416, is in a position to be contacted by the cam 402c; and the cam 402c contacts the finger 412d at the minimum log length position of the extendable beam 40, rotating the finger 412d to the position as shown for the finger 412e. Now the minimum long length cam 420 is rotated counterclockwise to a position wherein that portion of the minimum log length cam 420 which is intercepted by a line 424b contacts a cam follower 426b actuating the minimum log length pilot valve 324a leftwardly, blocking fluid flow therethrough.

As the extendable beam member proceeds in the delimb direction of the arrow 84, the finger 412c is now in a position to be contacted by the cam 402e; and as the extendable beam 40 reaches the maximum log length position, the multi-lobed actuator 410 is rotated to a position wherein the finger 412c is in the position shown for the finger 412e, rotating the maximum log length cam 422 to a position wherein that portion of the cam 422 which is intersected by a line 424c contacts a cam follower 426c of the maximum log length pilot valve 324b, blocking fluid flow through the pilot valve 324b.

As the extendable beam 40 moves in the retract direction, as indicated by the arrow 85, the multi-lobed actuator 410 is moved in the clockwise direction, as viewed in FIG. 8A, by successively contacting the cams 402e, 402c, and 402a.

Thus, it is readily apparent that the snowflake cam mechanism 400 cooperates with the hydraulic pilot system 300 of FIG. 7A to automatically control the processing cycle of the tree harvester 10, as described in conjunction with FIGS. 7A and 7B.

Concluding Comments

In conclusion, the tree harvester of the present invention includes unique flexible tension mechanisms which longitudinally move the carriage and which actuate both the topping knives and delimber knives, a unique method of mounting the delimber knives that decreases downtime when replacing dulled knives, automatic control of processing cycle that starts automatically and that can be manually overridden and manually actuated, a logic system that energizes the topping knives according to predetermined length and diameter parameters and according to individual tree size, a hydraulic system that maintains substantially constant and manually adjustable processing clamp and delimber knife pressures, a hydraulic pilot system that utilizes constant fluid flow to the valve actuators for improved cold climate operation and that provides substantially equal pressure drops to both sides of each valve actuator, and a snowflake cam mechanism that receives beam position signals corresponding to a plurality of extendable beam longitudinal locations and that rotates a plurality of cams to provide logic functions.

While only a single embodiment of the present invention has been described in detail, it will be understood that each detailed description is intended to be illustrative only and that various modifications and changes may be made to the present invention without departing from the spirit and scope of it. Therefore, the limits of the present invention should be determined from the attached claims.

What is claimed is:

1. A tree harvester which comprises a first elongated beam member;
   a second elongated beam member being longitudinally disposed with respect to said first beam member, being guidingly mounted thereto, and being longitudinally movable in first and second directions with respect to said elongation of said first beam member;
   first means for longitudinally moving said second beam member in said first direction;
   a third member being guidingly mounted to said second elongated beam member and being longitudinally movable in first and second directions with respect to said elongation thereof;
   second means for longitudinally moving said third member in said first direction with respect to said second beam member;
   a fourth member being secured to said third member and being movable with respect thereto;
   a fifth member being secured to said first beam member; and
   means, comprising a flexible tension element having a portion thereof that is substantially longitudinally disposed, for mechanically transmitting motions in first and second directions from said fifth member to said fourth member.

2. A tree harvester as claimed in claim 1 in which said mechanical transmitting of motion from said fifth member to said fourth member is selectively concurrent with and substantially independent of said longitudinal movements of said second and third members in said first direction.

3. A tree harvester which comprises a first elongated beam member having first and second ends;
   a second elongated beam member having first and second ends, being longitudinally disposed with respect to said first elongated beam member, being guidingly mounted thereto, and being longitudinally movable in first and second directions with respect to said elongation of said first beam member;
   means for longitudinally moving said second beam member in said first and second directions;
   a third member being guidingly mounted to said second elongated beam member and being longitudinally movable in said first and second directions;
   a fourth member being secured to said third member and being movable with respect thereto;
   a fifth member being secured to said first beam member; and
   means, comprising a flexible tension element having portions thereof that are substantially longitudinally disposed, for longitudinally moving said third member by said flexible tension element in said first and second directions and at substantially the same velocity with respect to said second beam member as said moving of said second beam member with respect to said first beam member when said second beam member is moving in said first or second direction, and for mechanically transmitting motions from said fifth member to said fourth member through said flexible tension element substantially independent of and selectively concurrent with said longitudinal movements of said second and third members in said first or second direction.

4. A tree harvester as claimed in claim 3 in which said mechanical transmitting of motion from said fifth member to said fourth member is selectively concurrent with and substantially independent of said longitudinal movement of said second and third members in said second direction.

5. A tree harvester as claimed in claim 4 in which said longitudinal moving and mechanical motion transmitting means and said flexible tension element thereof comprises:

sheave means, being operatively attached to said second elongated beam member proximal to one of said ends thereof, for receiving first and second spaced-apart strands of said flexible tension element that are longitudinally disposed along said second elongated beam member and for bending said strands substantially 180 degrees;

first and second spaced-apart strands of said flexible tension element each being wrapped substantially 180 degrees around said sheave means, each having a first longitudinal portion that extends substantially parallel to said second beam member to a point proximal to said fifth member, and each having a second longitudinal portion that extends substantially parallel to said elongation of said second beam member to a point proximal to said fourth member;

first means for mechanically interconnecting said first longitudinal portions of said first and second strands, for receiving mechanical motion from said fifth member, for imparting longitudinally opposite tension motion to said first and second strands, for transmitting a tension motion from one of said strands that is moving away from said first mechanical interconnecting means into an equal distance tension motion in the other of said strands toward said first mechanical interconnecting means, and for tension anchoring said flexible tension element to said first beam member insensitive to said longitudinally opposite tension motions; and second means for mechanically interconnecting said second longitudinal portions of said first and second strands, for transmitting said longitudinally opposite tension motions to said fourth member, for transmitting a tension motion from one of said strands that is moving away from said second mechanical interconnecting means into an equal distance tension motion in the other of said strands toward said second mechanical interconnecting means, and for tension anchoring said flexible tension element to said third member insensitive to said longitudinally opposite tension motions.

6. A tree harvester as claimed in claim 5 in which one of said mechanical interconnecting means comprises a mechanical linkage.

7. A tree harvester as claimed in claim 5 in which one of said mechanical interconnecting means comprises a sheave, a pivot pin, and a third portion of said flexible tension element.

8. A tree harvester as claimed in claim 5 in which said second mechanical interconnecting means comprises a sheave, a pivot pin having a pivot axis, and a third portion of said flexible tension element;

said pivot pin being attached to said second beam member with said pivot axis disposed substantially orthogonal to said elongation of said second beam member; said sheave being rotatably mounted onto said pivot pin;

said transmitting of a tension motion in said one strand to a tension motion in said other strand comprising said sheave and said third portion; and said tension anchoring of said first longitudinal portions to said first beam member insensitive to said longitudinally opposite tension motions comprising said pivot pin and said attachment thereof to said second member.

9. A tree harvester as claimed in claim 4 in which said mechanism includes third means, comprising a second flexible tension element, for longitudinally moving said third member in said second direction at substantially the same velocity as said second beam member is moving when said second beam member is moving in said second direction.

10. A tree harvester as claimed in claim 9 in which said mechanism includes a sixth member being secured to said third member and being movable with respect thereto;

a seventh member being secured to said first beam member and being movable with respect thereto; and means, comprising said second tension element, for transmitting a mechanical motion from said seventh member to said sixth member through said second flexible tension element selectively concurrent with and substantially independent of said longitudinal movements of said second and third members in said first and second directions.

11. A tree harvester as claimed in claim 10 in which first said means for longitudinally moving said second beam member in said first and second directions comprises a winch drum being rotatably mounted to said first beam member proximal to said second end thereof on a rotational axis that is orthogonal to said elongation of said first beam member;

a third flexible tension element that has one end thereof attached to said second beam member proximal to said second end thereof and that has the other end thereof attached to said winch drum; and a fourth flexible tension element that has one end thereof attached to said second beam member proximal to said first end thereof and that has the other end thereof attached to said winch drum.

12. A tree harvester which comprises a first elongated beam member having first and second ends;

a second elongated beam member having first and second ends, being longitudinally disposed with respect to said first elongated beam member, being guidingly mounted thereto, and being longitudinally movable in first and second directions with respect to said elongation of said first beam member;

a third member being guidingly mounted to said second elongated beam member and being longitudinally movable with respect to said elongation thereof in said first and second directions;

a fourth member being secured to said third member and being movable with respect thereto;

a fifth member being secured to said first beam member;

first and second sheaves being mounted to said second beam member proximal to one of said ends thereof and substantially orthogonal to said elongation thereof;

a third sheave being mounted to said third member substantially orthogonal to said elongation of said second beam member;

a fourth sheave being mounted to said first beam member substantially orthogonal to said elongation thereof;

flexible tension element means for connecting said third member to said first beam member by a pair of spaced-apart strands of said flexible tension element means, for effectively functioning as an endless flexible tension element, and for effectively extending from said fourth sheave to said first sheave, to said third sheave, to said second sheave, and back to said fourth sheave, all in direction changing wrapping engagement;

first means for connecting said fifth member to said flexible tension element means to impart reciprocating tension motions into one of said strands, whereby said reciprocating tension motions are effective to rotate said sheaves and to reposition said flexible tension element but are ineffective to change the length of said flexible tension element or the length of said spaced-apart strands thereof;

second means for connecting said fourth member to said flexible tension element means to receive said reciprocating tension motions therefrom; and means for longitudinally moving said second beam member in the one of said directions that applies tension forces to said flexible tension element means and said engagements thereof with said first and second sheaves; whereby said tension forces are effective to move said third member in said one direction at substantially the same velocity with respect to said second beam member as said second beam member is moved in said one direction by said longitudinal moving means insensitive to said reciprocating motions in said one strand.

13. A tree harvester as claimed in claim 12 in which said mechanism further comprises a sixth member being secured to said third member and being movable with respect thereto;

a seventh member being secured to said first member and being movable with respect thereto;

fifth and sixth sheaves being mounted to said second beam member proximal to the other of said ends thereof and substantially orthogonal to said elongation thereof;

a seventh sheave being mounted to said third member substantially orthogonal to said elongation of said second beam member;

an eighth sheave being mounted to said first beam member substantially orthogonal to said elongation thereof;

second flexible tension element means for effectively functioning as a second endless flexible tension element, and for extending from said eighth sheave to said fifth sheave, to said seventh sheave, to said sixth sheave, and back to said eighth sheave, all in direction changing wrapping engagement;

third means for connecting said seventh member to said second flexible tension element means to impart reciprocating tension motions thereto;

fourth means for connecting said sixth member to said second flexible tension element means to receive said reciprocating tension motions therefrom; and second means for longitudinally moving said second beam member in the one of said directions that applies tension forces to said second flexible tension element means and said engagements thereof with said fifth and sixth sheaves; whereby said tension forces in said second flexible tension element means are effective to move said third member in the other of said directions at substantially the same velocity with respect to said second beam member as said second beam member is moved in said other direction by said second longitudinal moving means insensitive to said reciprocating tension motions imparted by said third connecting means.

14. A tree harvester as claimed in claim 13 in which first said longitudinal moving means and said second longitudinal moving means comprise a winch drum, a third flexible tension element being attached to said second beam member proximal to one of said ends thereof and to said winch drum, and a fourth flexible tension element being attached to said second beam member proximal to the other of said ends thereof and to said winch drum.

15. A tree harvester which comprises a first elongated beam member;

a second elongated beam member, being longitudinally disposed with respect to said first elongated beam member, being guidingly mounted thereto, and being longitudinally movable in first and second directions with respect to said elongation of said first beam member;

means for longitudinally moving said second beam member in said first direction;

a third member being guidingly mounted to said second elongated beam member and being longitudinally movable in said first and second directions;

knife means, being mounted to said third member, and comprising a movable knife, for performing work on a tree that is disposed substantially parallel to said first elongated beam member;

a fourth member being secured to said first beam member and being movable with respect thereto; and means, for moving said third member in one of said directions, and for mechanically transmitting motions in first and second directions from said fourth member to said movable knife.

16. A tree harvester as claimed in claim 15 in which said knife means comprises delimber knife means for opening, for closing around a tree that is disposed substantially parallel to said first elongated beam member, and for stripping limbs from said tree as said third member is moved in one of said directions.

17. A tree harvester as claimed in claim 15 in which knife means comprises topping knife means, for topping a tree that is disposed substantially parallel to said first elongated beam member.

18. A tree harvester as claimed in claim 17 in which said tree harvester further comprises a fifth member being secured to said first member and being movable with respect thereto;

delimber knife means, being mounted to said third member, and comprising a movable delimber knife, for opening, for closing around a tree that is disposed substantially parallel to said first elongated beam member, and for stripping limbs from said tree as said third member is moved in one of said directions; and means for mechanically transmitting motion from said fifth member to said delimber knife.

19. A tree harvester as claimed in claim 15 in which said means for mechanically transmitting motion from said fourth member to said movable knife comprises a flexible tension element.

20. A tree harvester as claimed in claim 19 in which said movable knife comprises a knife shaft and a knife blade extending orthogonally outward from said knife shaft;

said mounting of said knife means to said third member comprises a hub being rotatably journalled to said third member, drivingly receiving said knife shaft in a longitudinally disposed bore therein, and having an arcuate segment extending radially outward therefrom; and said means for mechanically transmitting motion from said fourth member to said movable knife comprises said flexible tension element and said arcuate segment.

21. A tree harvester as claimed in claim 20 in which said means for mechanically transmitting motion from said fourth member to said movable knife comprises rotation transmitting engagement between said knife shaft and said hub bore.

22. A tree harvester as claimed in claim 21 in which said tree harvester includes means for releasably retaining said knife shaft in said hub bore.

23. A tree harvester as claimed in claim 20 in which said knife shaft includes a longitudinally disposed shaft bore therein; and said means for mechanically transmitting motion from said fourth member to said movable knife comprises a torque rod having a first end that rotationally engages said hub bore and having a second end that rotationally engages said shaft bore.

24. A tree harvester as claimed in claim 23 in which said tree harvester includes means for releasably retaining said knife shaft in said hub bore.

25. A tree harvester as claimed in claim 24 in which said means for releasably retaining comprises said torque rod.

26. A tree harvester which comprises a first elongated beam member;

a second elongated beam member, being longitudinally disposed with respect to said first elongated beam member, being guidingly mounted thereto, and being longitudinally movable in first and second directions with respect to said elongation of said first beam member;

means for longitudinally moving said second beam member in said first and second directions;

a third member being guidingly mounted to said second elongated beam member and being longitudinally movable in first and second directions;

delimber knife means, being mounted to said third member, and comprising a movable delimber knife, for opening, for closing around a tree that is disposed substantially parallel to said first elongated beam member, and for stripping limbs from said tree as said third member is moved in said first direction;

topping knife means, being mounted to said third member, and comprising a movable topping knife, for topping a tree that is disposed substantially parallel to said first elongated beam member;

a fourth member being secured to said first beam member; and means, comprising a flexible tension element, for longitudinally moving said third member by said flexible tension element in said first direction at the same speed as said longitudinal moving of said second beam member when said second beam member is moving in said first direction, and for mechanically transmitting motion from said fourth member to one of said movable knives by said flexible tension element selectively concurrent with and substantially independent of said longitudinal moving of said second and third members in said first direction.

27. A tree harvester as claimed in claim 26 in which said longitudinal moving and mechanical motion transmitting means and said flexible tension element thereof comprises:

sheave means, being operatively attached to said second elongated beam member proximal to one of said ends thereof, for receiving first and second spaced-apart strands of said flexible tension element that are longitudinally disposed along said second elongated beam member and for bending said strands substantially 180 degrees;

first and second spaced-apart strands of said flexible tension element each being wrapped substantially 180 degrees around said sheave means, each having a first longitudinal portion that extends substantially parallel to said second beam member to a point proximal to said fifth member, and each having a second longitudinal portion that extends substantially parallel to said elongation of said second beam member to a point proximal to said fourth member;

first means for mechanically interconnecting said first longitudinal portions of said first and second strands, for receiving mechanical motion from said fifth member, for imparting longitudinally opposite tension motions to said first and second strands, for transmitting a tension motion from one of said strands that is moving away from said first mechanical interconnecting means into an equal distance tension motion in the other one of said strands toward said first mechanical interconnecting means, and for tension anchoring said flexible tension element to said first beam member insensitive to said longitudinally opposite tension motions; and second means for mechanically interconnecting said second longitudinal portions of said first and second strands, for transmitting said longitudinally opposite tension motions to said fourth member, for transmitting a tension motion from one of said strands that is moving away from said second mechanical interconnecting means into an equal distance tension motion in the other of said strands toward said second mechanical interconnecting means, and for tension anchoring said flexible tension element to said third member insensitive to said longitudinally opposite tension motions.

28. A tree harvester as claimed in claim 27 in which said one movable knife comprises said movable delimber knife;

said delimber knife means comprises a pair of substantially parallel and spaced-apart delimber knife hubs being rotationally journalled to said third member to rotate about axes that are substantially parallel to said elongation of said second beam member, and each having a longitudinally disposed bore therein; and said movable delimber knife comprises a delimber knife shaft being rotationally secured in said hub bore, and a delimber knife blade having one end thereof attached to said delimber knife shaft and extending orthogonally outward therefrom.

29. A tree harvester as claimed in claim 28 in which said first means for mechanically interconnecting said first longitudinal portions of said first and second strands comprises first and second arcuate segments being secured to respective ones of said delimber knife hubs and extending radially outward therefrom in respective orthogonal planes;

a first interconnecting portion of said flexible tension element operatively interconnecting said first strand and said first arcuate segment;

second sheave means, being rotatably secured to said third member, for bending said first interconnecting portion from longitudinal alignment with said first strand to orthogonal plane alignment with said first arcuate segment;

a second interconnecting portion of said flexible tension element operatively interconnecting said second strand and said second arcuate segment;

third sheave means, being rotatably secured to said third member, for bending said second interconnecting portion from longitudinal alignment with said second strand to orthogonal plane alignment with said second arcuate segment;

third and fourth arcuate segments each being secured to one of said delimber knife hubs and each extending radially outward therefrom in an orthogonal plane; and third interconnecting portion means of said flexible tension element operatively interconnecting said third and fourth arcuate segments.

30. A tree harvester as claimed in claim 29 in which said tree harvester additionally comprises a fifth member being secured to said first beam member and being movable with respect thereto; and means, comprising a third flexible tension element, for longitudinally moving said third member in said second direction at the same speed as said longitudinal moving of said second beam member when said second beam member is moving in said second direction, and for mechanically transmitting a motion from said fifth member to said topping knife by said third flexible tension element selectively concurrent with and substantially independent of said longitudinal moving of said second and third members in one of said directions.

31. A tree harvester as claimed in claim 27 in which said one movable knife comprises said movable topping knife;

said topping knife means comprises a pair of substantially parallel and spaced-apart topping knife hubs being rotatably journalled to rotate about axes that are substantially orthogonal to said elongation of said second beam member, and each having a longitudinally disposed bore therein; and said movable topping knife comprises a topping knife shaft being rotationally secured in said hub bore, and a topping knife blade having one end thereof attached to said topping knife shaft and extending orthogonally outward therefrom.

32. A tree harvester as claimed in claim 31 in which said first means for mechanically interconnecting said first longitudinal portions of said first and second strand portions comprises first and second arcuate segments being secured to respective ones of said topping knife hubs and extending radially therefrom in respective orthogonal planes;

a first interconnecting portion of said flexible tension element operatively interconnecting said first strand and said first arcuate segment;

second sheave means, being rotatably secured to said third member, for bending said first interconnecting portion from longitudinal alignment with said first strand to orthogonal plane alignment with said first actuator segment;

a second interconnecting portion of said flexible tension element operatively interconnecting said second strand of said second arcuate segment;

third sheave means, being rotatably secured to said third member, for bending said second interconnecting portion from longitudinal alignment with said second strand to orthogonal plane alignment with said second arcuate segment;

third and fourth arcuate segments each being secured to one of said topping knife hubs and extending radially outward therefrom in an orthogonal plane; and third interconnecting portion means of said flexible tension element operatively interconnecting said third and fourth arcuate segments.

33. A tree harvester as claimed in claim 32 in which said tree harvester further comprises a fifth member being secured to said first beam member and being movable with respect thereto; and means, comprising a third flexible tension element, for longitudinally moving said third member in said second direction at the same speed as said longitudinal moving of said second beam member when said second beam member is moving in said second direction, and for mechanically transmitting a motion from said fifth member to said delimber knife by said third flexible tension element selectively concurrent with and substantially independent of said longitudinal moving of said second and third members in one of said directions.

34. A tree harvester mechanism which comprises an elongated beam member;

a second member being guidingly mounted with respect to said elongated beam member and being longitudinally movable in first and second directions with respect to said elongation thereof;

means for longitudinally moving said second member in said first and second directions;

delimber knife means, being mounted to said second member, and comprising a movable delimber knife, for opening, for closing around a tree that is disposed substantially parallel to said elongated beam member, and for stripping limbs from said tree as said second member is moved in one of said directions;

topping knife means, being mounted to said second member, and comprising a movable topping knife, for topping a tree that is disposed substantially parallel to said elongated beam member;

a fluid actuator being fixedly secured with respect to said elongated beam member; and means for mechanically transmitting motion from said fluid actuator to one of said movable knives.

35. A tree harvester as claimed in claim 34 in which said one movable knife comprises a knife shaft, and a knife blade extending orthogonally outward from said knife shaft;

said mounting of said one movable knife comprises a hub being rotatably journalled onto said second member, and having a longitudinal bore therein;

said knife shaft is disposed within said bore and is rotationally secured to said knife shaft; and said means for mechanically transmitting motion comprises an arcuate segment extending radially outward from said hub, and a flexible tension element being operatively connected to said arcuate segment.

36. A tree harvester as claimed in claim 35 in which said tree harvester includes means for releasably retaining said shaft in said hub.

37. A tree harvester which comprises an elongated beam member having first and second ends;
   a second member being guidingly mounted with respect to said elongated beam member and being longitudinally movable in a first direction in which said second member moves toward said second end of said elongated beam member, and being movable in a second direction;
   delimber knife means, being mounted to said second member, and comprising a movable delimber knife, for opening, for closing around a tree that is disposed substantially parallel to said elongated beam member, and for stripping limbs from said tree as said second member is moved in said first direction;
   topping knife means, being longitudinally interposed between said delimber means and said first end of said elongated beam member, being mounted to said second member, and comprising first and second movable topping knives for topping a tree that is disposed substantially parallel to said elongated beam member;
   said topping knives each comprise a topping knife shaft, and a topping knife blade that extends orthogonally outward from the respective one of said topping knife shafts, and that includes a cutting edge that is distal from said shaft and substantially parallel thereto;
   said topping knife means closes by rotation of one of said shafts in one direction and rotation of the other of said shafts in the other direction to respective positions wherein said cutting edges are proximal to each other; and
   means for closing said delimber knife means and for moving said second member in said first direction; whereby
   said delimber knife means precedes said topping knife means as said second member moves in said first direction, stripping limbs from said tree ahead of and away from said topping knife means and thereby preventing said stripped limbs from interfering with said moving of said movable topping knife means.

38. A tree harvester which comprises a first elongated beam member having first and second ends;
   a second elongated beam member, being longitudinally disposed with respect to said first elongated beam member, being guidingly mounted thereto, and being longitudinally movable with respect to said elongation thereof from a closed position to a maximum extended position wherein said second beam member is distal from said first end of said first beam member;
   first means for longitudinally moving said second beam member in a first direction toward said extended position and in a second direction back to said closed position;
   a third member being guidingly mounted to said second elongated beam member and being longitudinally movable with respect to said elongation thereof in said first and second directions;
   second means for longitudinally moving said third member longitudinally in said first and second directions;
   delimber knife means, being mounted to said third member, and comprising a movable delimber knife, for opening, for closing around a tree that is disposed substantially parallel to said elongated beam member, and for stripping limbs from said tree as said third member is moved in said first direction; and
   topping knife means, being mounted to said third member longitudinally intermediate of said delimber knife means and said first end of said first beam member, and comprising a movable topping knife, for topping a tree that is disposed substantially parallel to said second elongated beam member; whereby
   said delimber knife means precedes said topping knife means as said third member moves toward said extended position stripping limbs from said tree ahead of and away from said topping knife means and thereby preventing said stripped limbs from interfering with said moving of said movable topping knife.

39. A tree harvester which comprises an elongated beam member having first and second ends;
   a second member being guidingly mounted with respect to said elongated beam member and being longitudinally movable in first and second directions with respect to said elongation thereof;
   delimber knife means, being mounted to said second member, and comprising a movable delimber knife, for opening, for closing around a tree that is disposed with the butt end thereof proximal to said first end and that is disposed substantially parallel to said elongated beam member, and for stripping limbs from said tree as said second member is moved in said first direction;
   topping knife means, being mounted to said second member, and comprising a movable topping knife, for topping said tree;
   means for longitudinally moving said second member and both of said knife means from retracted positions that are proximal to said first end to both predetermined minimum and predetermined maximum log length positions;
   log diameter sensing means, being mounted to said second member and being disposed longitudinally proximal to said topping knife, for sensing the longitudinal position of said topping knife wherein the diameter of the log of said tree has reduced to a predetermined minimum log diameter; and
   logic means, being operatively connected to said sensing means and to said topping knife means, for actuating said topping knife in response to said topping knife reaching both said predetermined minimum log length position and said longitudinal position wherein the diameter of said log is reduced to said predetermined minimum log diameter.

40. A tree harvester as claimed in claim 39 in which said tree harvester includes means, comprising said logic means, for returning said second member to said retracted position in response to actuation of said topping knife means without said second member moving to said predetermined maximum log length position if said topping knife is actuated intermediate of said predetermined minimum and maximum log length positions.

41. A tree harvester as claimed in claim 39 in which said tree harvester includes means for actuating said topping knife at said predetermined maximum log length position if said log diameter is larger than said predetermined minimum log diameter when said topping knife means reaches said maximum log length position.

42. A tree harvester as claimed in claim 41 in which said logic means comprises cam means for determining when said topping knife means has extended to said predetermined minimum log length position, and for determining when said topping knife means has extended to said predetermined maximum log length position.

43. A tree harvester as claimed in claim 42 in which said logic means further comprises a cam shaft being rotatably mounted to said first beam member orthogonal to said elongation thereof; and multilobed actuator means, comprising a plurality of fingers being disposed circumferentially around said shaft and extending radially outward therefrom, for contacting said cam means and for receiving motion therefrom, for turning said cam shaft a first fraction of a rotation when said topping knife means reaches said minimum log length position, and for turning said cam shaft a second fraction of a rotation when said topping knife means reaches said predetermined maximum log length position.

44. A tree harvester as claimed in claim 43 in which said multilobed actuator means and said plurality of fingers thereof comprise three of said fingers extending radially outward from said cam shaft in equal angular spaces in a first orthogonal plane, and three more of said fingers extending radially outward from said cam shaft angularly intermediate of respective ones of first said three fingers and longitudinally displaced from said first orthogonal plane to a second orthogonal plane; and said cam means comprises a first cam contacting one of said fingers in said first plane when said topping knife reaches said predetermined minimum log length position as said second member moves in said first direction, and a second cam contacting one of said fingers in said second plane when said topping knife moves past said predetermined minimum log length position as said second member moves toward said retracted position.

45. A tree harvester which comprises an elongated beam member having first and second ends;

a second member being guidingly mounted with respect to said elongated beam member and being longitudinally movable in first and second directions with respect to said elongation thereof;

delimber knife means, being mounted to said member, and comprising a movable delimber knife, for opening, for closing around a tree that is disposed with the butt end thereof proximal to said first end and that is disposed substantially parallel to said elongated beam member, and for stripping limbs from said tree as said second member is moved in said first direction;

topping knife means, being mounted to said second member, and comprising a movable topping knife, for topping said tree;

means for longitudinally moving said second member and both of said knife means from retracted positions that are proximal to said first end to both predetermined minimum and predetermined maximum log length positions;

log diameter sensing means, being mounted to said second member and being disposed longitudinally proximal to said topping knife, for sensing the longitudinal position of said topping knife wherein the diameter of the log of said tree has reduced to a predetermined minimum log diameter; and logic means, being operatively connected to said sensing means and to said topping knife means, for actuating said topping knife in response to said topping knife reaching said longitudinal position wherein the diameter of said log is reduced to said predetermined minimum log diameter, and for returning said second member to said retracted position in response to actuation of said topping knife without said second member moving to said predetermined maximum log length position if said topping knife is actuated before said second member reaches said predetermined maximum log length position.

46. A tree harvester which comprises an elongated beam member having first and second ends;

a second member being guidingly mounted with respect to said elongated beam member and being longitudinally movable in a delimb direction from a retracted position wherein said second member is proximal to said first end to a maximum log length position wherein said second member is distal from said first end, and being movable in a return direction to said retracted position;

means, comprising a first energizable actuator, for longitudinally moving said second member in said delimb and return directions;

delimber knife means, being mounted to said second member, and comprising a movable delimber knife, for opening, for closing around a tree that is disposed substantially parallel to said elongated beam member, and for stripping limbs from said tree as said third member is moved in said delimb direction;

second energizable actuator means, being operatively connected to said delimber knife means, for opening and closing said delimber knife means;

topping knife means, being operatively connected to said second member, and comprising a movable topping knife, for topping a tree that is disposed substantially parallel to said elongated beam member;

third energizable actuator means, being operatively connected to said movable topping knife, for actuating said movable topping knife;

automatic control means for sequentially energizing said second actuator means to close said delimber knife means, energizing said first actuator to move said second member in said delimb direction, energizing said third actuator means to actuate said topping knife means, and energizing said second actuator means to return said second member to said retracted position, all in response to placing a felled tree into position on said tree harvester; and said automatic control means comprises a hydraulic pilot system having a source of pressurized fluid that includes a pump and a sump, having a plurality of conduits with first and second ends that are connected respectively with said pump and said sump, having a plurality of valve actuators that each include a port communicated with one of said conduits intermediate of said ends, and means, comprising a pilot valve and a fluid restrictor that are interposed into one of said conduits on opposite sides of said communication of one of said ports, for selectively pressurizing said one port.

47. A tree harvester as claimed in claim 46 in which said tree harvester includes processing clamp means, being operatively connected to said elongated beam member, for holding the butt end of a tree that is disposed substantially parallel to said elongated beam member;
- fourth energizable actuator means, being operatively connected to said processing clamp means for opening and closing said clamp means; and
- said automatic control means energizes said fourth actuator means prior to said actuating of said second actuator; whereby
- said tree is secured to said elongated beam member before said second member is moved in said delimb direction.

48. A tree harvester as claimed in claim 47 in which said processing clamp means includes tiltable cradle means for tilting said clamp means in a plane substantially orthogonal to said elongation of said elongated beam member;
- said tree harvester includes fifth energizable actuator means for tilting said cradle means; and
- said automatic control means energizes said fifth actuator means to tilt said cradle subsequent to energizing said third actuator means to top said tree, and energizes said fourth actuator means to release said tree subsequent to said energizing of said fifth actuator.

49. A tree harvester as claimed in claim 46 in which each of said energizable actuator means comprises respective ones of first, second, and third fluid actuators; and
- said sequential energizing of said first energizable actuator after said second energizable actuator comprises a pressure actuated sequence valve.

50. A tree harvester as claimed in claim 46 in which said automatic control means includes manual override means for stopping said sequential energizing, and for manually energizing any of said actuators.

51. A tree harvester which comprises an elongated beam member having first and second ends;
- a second member being guidingly mounted with respect to said elongated beam member and being longitudinally movable in a delimb direction from a retracted position wherein said second member is proximal to said first end to a maximum log length position wherein said second member is distal from said first end, and being movable in a return direction to said starting position;
- means, comprising a first energizable actuator, for longitudinally moving said second member in said delimb and return directions;
- delimber knife means, being mounted to said second member, and comprising a movable delimber knife, for opening, for closing around a tree that is disposed substantially parallel to said elongated beam member, and for stripping limbs from said tree as said third member is moved in said delimb direction;
- second energizable actuator means, being operatively connected to said delimber knife means, for opening and closing said delimber knife means;
- topping knife means, being operatively connected to said second member, and comprising a movable topping knife, for topping a tree that is disposed substantially parallel to said elongated beam member;
- third energizable actuator means, being operatively connected to said movable topping knife, for actuating said movable topping knife; and
- automatic control means for sequentially energizing said second actuator means to close said delimber knife means, energizing said first actuator to move said second member in said delimb direction, energizing said third actuator means to actuate said topping knife means, and energizing said second actuator means to return said second member to said retracted position subsequent to said actuating of said movable topping knife and irrespective of the position of said second member when said topping knife means is actuated.

52. A tree harvester as claimed in claim 51 in which each of said energizable actuators comprises respective ones of first, second, and third fluid actuators; and
- said sequential energizing of said third energizable actuator comprises a mechanically actuated valve that is actuated when said cutting knife means reaches a minimum log length as said second member moves in said delimb direction.

53. A tree harvester as claimed in claim 52 in which said sequential energizing of said third energizable actuator further comprises a mechanically actuated valve that is actuated when said cutting knife means reaches a position wherein a given tree is reduced in size to a predetermined minimum log diameter.

54. A tree harvester as claimed in claim 51 in which said second energizable actuator comprises a fluid actuator; and
- said automatic control means comprises means for supplying fluid pressure to said fluid actuator and for maintaining said fluid pressure between predetermined minimum and maximum pressure magnitudes irrespective of the size of a tree at the position wherein said delimber knives contact said tree.

55. A tree harvester as claimed in claim 54 in which one of said automatic control means includes means for manually adjusting one of said predetermined pressure magnitudes.

56. A tree harvester as claimed in claim 51 in which said energizable actuators comprise fluid actuators;
- said automatic control means comprises a hydraulic actuating system and a hydraulic pilot system;
- said hydraulic actuating system comprises said fluid actuators and a plurality of directional control valves each being connected to one of said fluid actuators; and
- said hydraulic pilot system comprises a source of pressurized fluid including a pump and a sump, a plurality of valve actuators each being connected to one of said directional control valves and each having two ports, a plurality of pilot conduits each connecting said source to one of said ports and said one port to said sump, a plurality of fluid restrictors each being interposed into one of said pilot conduits intermediate of said pump and the respective one of said ports, and a plurality of pilot valves each being interposed into one of said pilot conduits intermediate of respective ones of said ports and said sump.

57. A tree harvester as claimed in claim 56 in which said pilot valves each have free-flow and flow blocking positions; and
- said pilot valves are in said free-flow positions prior to said sequential energizing.

58. A tree harvester as claimed in claim 57 in which the viscous fluid resistances in two of said pilot lines, from two of said ports of one of said valve actuators to said sump, are substantially equal.

59. A tree harvester as claimed in claim 58 in which the viscous fluid resistances in said two pilot lines, from said pump to said two ports of said one valve actuator, are substantially equal.

* * * * *